(12) United States Patent
Takeuchi et al.

(10) Patent No.: US 6,753,998 B2
(45) Date of Patent: Jun. 22, 2004

(54) OPTICAL SYSTEM OF DISPLAY

(75) Inventors: Yukihisa Takeuchi, Nagoya (JP); Tsutomu Nanataki, Nagoya (JP); Iwao Ohwada, Nagoya (JP); Isao Shikata, Nagoya (JP); Kei Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1 day.

(21) Appl. No.: 10/075,101

(22) Filed: Feb. 12, 2002

(65) Prior Publication Data

US 2003/0063046 A1 Apr. 3, 2003

(30) Foreign Application Priority Data

Mar. 30, 2001 (JP) ........................................ 2001-100954

(51) Int. Cl.$^7$ ..................... G02B 26/00; G02B 6/10; G02B 6/00; G02B 6/26; G09G 3/34
(52) U.S. Cl. ...................... 359/291; 359/290; 359/295; 385/19; 385/129; 385/147; 345/84; 345/85; 345/108; 345/147
(58) Field of Search ................................. 359/291, 292, 359/294, 295, 298, 196, 896; 385/19, 128, 147, 901, 129; 345/85, 108, 147, 84; 362/26, 27, 29, 30, 31; 310/324, 328

(56) References Cited

U.S. PATENT DOCUMENTS

| | | | |
|---|---|---|---|
| 5,862,275 A | 1/1999 | Takeuchi et al. | 385/19 |
| 6,028,978 A | * 2/2000 | Takeuchi et al. | 385/147 |
| 6,108,479 A | 8/2000 | Takeuchi et al. | 385/129 |
| 6,195,196 B1 | * 2/2001 | Kimura et al. | 359/295 |
| 6,211,853 B1 | * 4/2001 | Takeuchi et al. | 345/108 |
| 6,226,080 B1 | 5/2001 | Takeuchi et al. | 356/239.1 |
| 6,249,370 B1 | * 6/2001 | Takeuchi et al. | 359/291 |
| 6,295,403 B1 | 9/2001 | Takeuchi et al. | 385/129 |
| 6,642,913 B1 | * 11/2003 | Kimura et al. | 345/84 |

FOREIGN PATENT DOCUMENTS

| | | |
|---|---|---|
| EP | 0 818 700 A2 | 1/1998 |
| JP | 08221013 | 8/1996 |

OTHER PUBLICATIONS

U.S. patent application Ser. No. 10/234,730, Takeuchi et al., filed Sep. 4, 2002.

* cited by examiner

Primary Examiner—Loha Ben
(74) Attorney, Agent, or Firm—Burr & Brown

(57) ABSTRACT

An optical system of a display including a light conducting plate introduced with light and a panel portion provided to oppose to one plate surface of the light conducting plate. The panel portion includes a driving part arranged with actuator parts each corresponding to a plurality of pixels so as to control displacement motions of the actuator parts in the contacting and separating directions to and from the light conducting plate correspondingly to attributions of input image signals, thereby controlling leaked light-beams in predetermined regions of the light conducting plate, to thereby cause the light conducting plate to display an image corresponding to the input image.

16 Claims, 34 Drawing Sheets

OPTICAL SYSTEM OF DISPLAY

This application claims the benefit of Japanese Application 2001-100,954, filed Mar. 30, 2001, the entirety of which is incorporated herein by reference.

FIELD OF THE INVENTION

The present invention relates to an optical system of a display.

BACKGROUND OF THE INVENTION

The present applicant has proposed a display element constituted of a rectangular light conducting plate introduced with light and a panel portion provided to oppose to one plate surface of the light conducting plate. The panel portion includes a driving part arranged with actuator parts each corresponding to a plurality of pixels so as to control displacement motions of the actuator parts in the contacting/separating directions to/from the light conducting plate correspondingly to attributions of input image signals, thereby controlling leaked light-beams in predetermined regions of the light conducting plate, to thereby cause the light conducting plate to display an image corresponding to the image signals (see JP-A-7-287176 [287176/1995] and JP-A-11-194723 [194723/1999]). Hereinafter, the display element having such a constitution shall be called a "display element relating to the present invention."

The display element relating to the present invention basically eliminates the necessity of an end-sealing structure such as a liquid crystal display or plasma display, thereby allowing to adopt a divided panel structure and to relatively readily deal with a large-sized thin panel. Further, the display element relating to the present invention is of a direct-viewing type, thereby enabling a higher contrast, rare discoloration, even under influence of the outdoor daylight, and a more excellent viewing angle even compared with a CRT.

It is therefore an object of the present invention to provide a novel optical system preferable to the display element relating to the present invention.

SUMMARY OF THE INVENTION

To achieve the above object, the present invention provides an optical system of a display, the display being constituted of: a light conducting plate introduced with light; and a panel portion provided to oppose to one plate surface of the light conducting plate; the panel portion including a driving part arranged with actuator parts each corresponding to a plurality of pixels so as to control displacement motions of the actuator parts in the contacting/separating directions to/from the light conducting plate correspondingly to attributions of inputted image signals, thereby controlling leaked light-beams in predetermined regions of the light conducting plate, to thereby cause the light conducting plate to display an image corresponding to the image signals. The optical system of the display is constituted of the light conducting plate, at least one light source arranged to oppose to one plate surface or one side surface, of the light conducting plate, and a reflector for surrounding the light source in cooperation with the one plate surface or the one side surface of the light conducting plate, the reflector having a reflecting surface for reflecting light-beams from the light source.

According to the present invention, the light conducting plate is introduced with not only direct light-beams from the light source but also light-beams reflected by the reflector, thereby allowing to relatively increase the ratio of the introduced light-beams into the light conducting plate relative to the exiting light-beams from the light source. As a result, even when those exiting light-beams from the light source are relatively weak, it is possible to fill light-beams into the light conducting plate, to thereby preferably constitute the optical system of the display.

Preferably, the panel portion is provided with display elements having predetermined number of pixels arranged on the one plate surface of the light conducting plate, and the optical system of the display further comprises a frame for surrounding an outer periphery of the panel portion. By virtue of such a frame, it becomes possible to position the panel portion upon adhering the same, and to avoid the light leakage at the periphery of the panel portion. The frame exemplarily has a light absorbing or light reflecting surface.

Preferably, the light conducting plate is rectangular or has a rectangular displaying area and the light conducting plate has a thickness of more than 0.01 and less than 0.1 times of the diagonal length of the light conducting plate or of the displaying area thereof. This facilitates those light-beams introduced into the one side surface of the light conducting plate to straightly advance up to the opposite side surface.

In order to improve the luminance characteristic of the display, it is preferable that the light source comprises two or more pieces of light sources, that the light sources are arranged at predetermined intervals therebetween along the one side surface of the light conducting plate and that the predetermined interval is not more than 0.05 times of the shortest distance between an outer periphery of the panel portion and the one side surface of the light conducting plate.

In order to correct color temperature, it is possible to further provide a color-temperature correction light source arranged for the one plate surface or one side surface of the light conducting plate. In this case, the reflector exemplarily accommodates therein 11 pieces of white light sources and one piece of blue light source. Further, it is possible to provide a color-temperature correction light-permeating plate or film arranged for the reflecting surface of the reflector or for the one plate surface or one side surface of the light conducting plate.

In order to improve the ratio of light-beams to be introduced into the light conducting plate and the ventilation, i.e., heat dissipation, the reflector preferably has a profile in an outwardly convexed shape formed by straight lines, continuous curved lines, or a combination thereof. More preferably, the space surrounded by the profile of the reflector and the one plate surface or one side surface of the light conducting plate has those maximum lengths which are not more than 3 times of the thickness of the light conducting plate, in both of the direction parallel to the one plate surface of the light conducting plate and the direction parallel to the one side surface of the light conducting plate.

In order to improve the luminance characteristic of the display, it is possible that the sum of sectional areas of light sources covered by the reflector is not more than 60% of a sectional area of a space surrounded by a profile of the reflector and the one plate surface or one side surface of the light conducting plate.

It is possible to provide a further reflector for defining another space in cooperation with a side surface of the light conducting plate, other than the one plate surface or one side surface of the light conducting plate, the further reflector having a reflecting surface for reflecting light-beams from the light source. In this case, those light-beams emitted from the other side surface are reflected by the further reflector and again introduced into the other side surface of the light conducting plate.

In order to improve the ratio of light-beams to be introduced into the light conducting plate and the ventilation, i.e., heat dissipation, the further reflector preferably has a profile in an outwardly convexed shape formed by straight lines, continuous curved lines, or a combination thereof. More preferably, the space surrounded by the profile of the additional reflector and the one plate surface or one side surface of the light conducting plate has those maximum lengths which are not more than 3.0 times of the thickness of the light conducting plate in the direction parallel to the one plate surface of the light conducting plate and 3.0 times of the thickness of the light conducting plate in the direction parallel to the one side surface of the light conducting plate, respectively.

The luminance uniformity of the display becomes excellent when there are constituted a first light-source group comprising not less than two light sources and a second light-source group comprising light sources in number less than the number of light sources of the first light-source group. The light sources of the first light-source group are arranged along one side surface of the light conducting plate, at predetermined intervals between adjacent ones of the light sources of the first light-source group. The light sources of the second light-source group are arranged along the first light-source group, at predetermined intervals between the light sources of the second light-source group and adjacent ones of the light sources of the first light-source group and at predetermined intervals between adjacent ones of the light sources of the second light-source group.

The luminance uniformity of the display also becomes excellent, when there are constituted a light-source group comprising a plurality of light sources.

The light sources are arranged along the reflecting surface of the reflector, at predetermined intervals between adjacent ones of the light sources. The light-source group includes a first light source and a second light source of the light sources, the first light source and the second light source being closest to one side surface of the light conducting plate. The optical system further comprises an additional light source arranged at an intermediate position of the first light source and the second light source.

DETAILED DESCRIPTION OF THE INVENTION

There will be described hereinafter the embodiments of an optical system of a display according to the present invention, with reference to the accompanying drawings.

Figure 1:
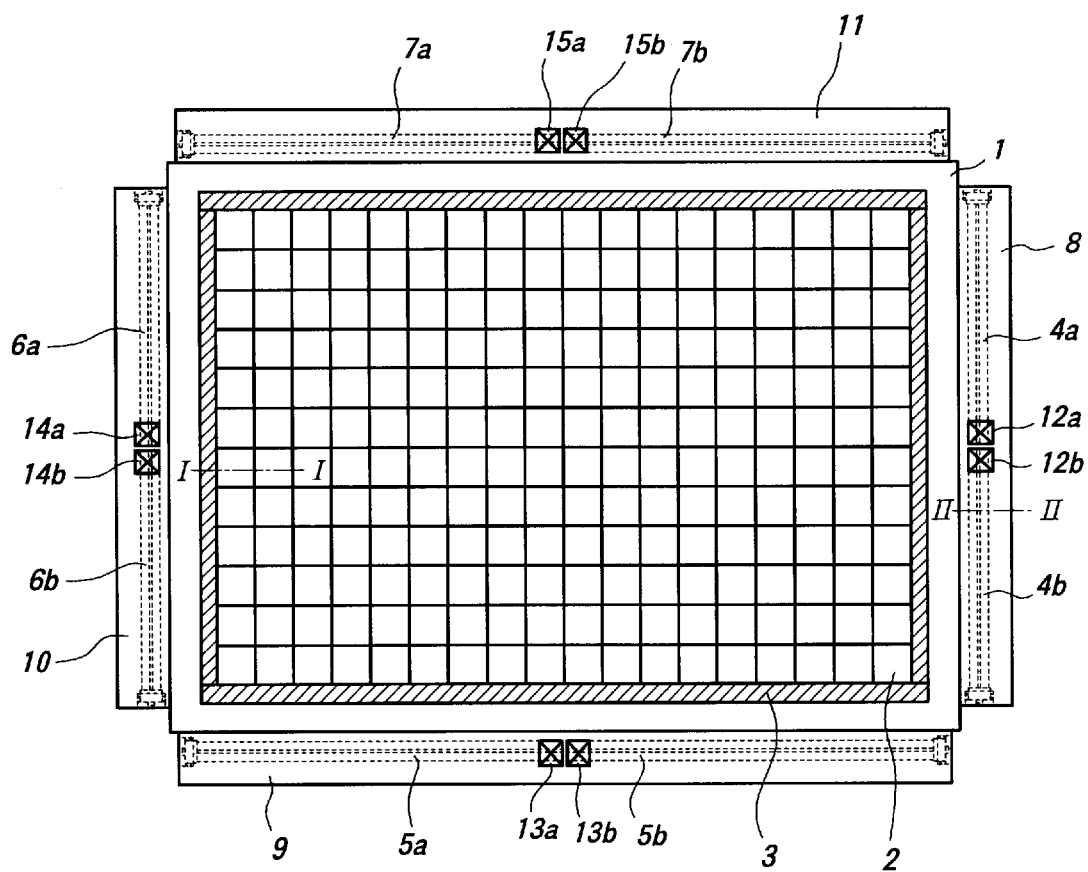
FIG. 1 is a view showing an embodiment of an optical system of a display according to the present invention.

FIG. 1 is a view showing an embodiment of an optical system of a display according to the present invention. This display comprises a light conducting plate 1 introduced with light-beams from side surfaces of the light conducting plate 1, respectively, a panel portion 2 constituted of a plurality of panels arranged in a matrix, a frame 3 for positioning these panels upon adhering them and for preventing light leakage at a periphery of the panel portion 2, light sources 4a, 4b, 5a, 5b, 6a, 6b, 7a, 7b arranged for the side surfaces of the light conducting plate 1, respectively, reflectors 8, 9, 10, 11, which surround the light sources 4a, 4b, 5a, 5b, 6a, 6b, 7a, 7b in cooperation with the associated side surfaces of the light conducting plate, and which have reflecting surfaces corresponding to light-beams from the light sources 4a, 4b, 5a, 5b, 6a, 6b, 7a, 7b, respectively, and air-cooling fans 12a, 12b, 13a, 13b, 14a, 14b, 15a, 15b fixed to the side surfaces of the reflectors 8, 9, 10, 11, respectively. Such a display is exemplarily arranged in an extended band-like shape on a wall surface facing to a passageway where people come and go.

Those incident light-beams into the light conducting plate 1 may be within any one of the ultraviolet, visible range and infrared regions. The light conducting plate 1 is required to have an optical refractive index such that those light-beams introduced into the light conducting plate 1 are totally reflected at the front surface and back surface thereof without permeating through the surfaces toward the outside of the light conducting plate 1 and to have a uniform and high transmittivity within the wavelength range of the introduced light-beams. The material for the light conducting plate 1 is not particularly limited insofar as it has the above described characteristics, and concretely and generally includes glass, quartz, light-permeating plastics such as acryls, polycarbonates, light-permeating ceramics, a structure including a plurality of layers having mutually different refractive indexes, or a body provided with a coating layer at its surface.

The light conducting plate 1 has a thickness of not less than 0.01 and less than 0.1 times of the diagonal length of the rectangular light conducting plate 1. This facilitates those light-beams introduced into the light conducting plate 1 from its one side surface to straightly advance up to the opposite side surface. This will be explained later, using experimental data.

Figure 2:
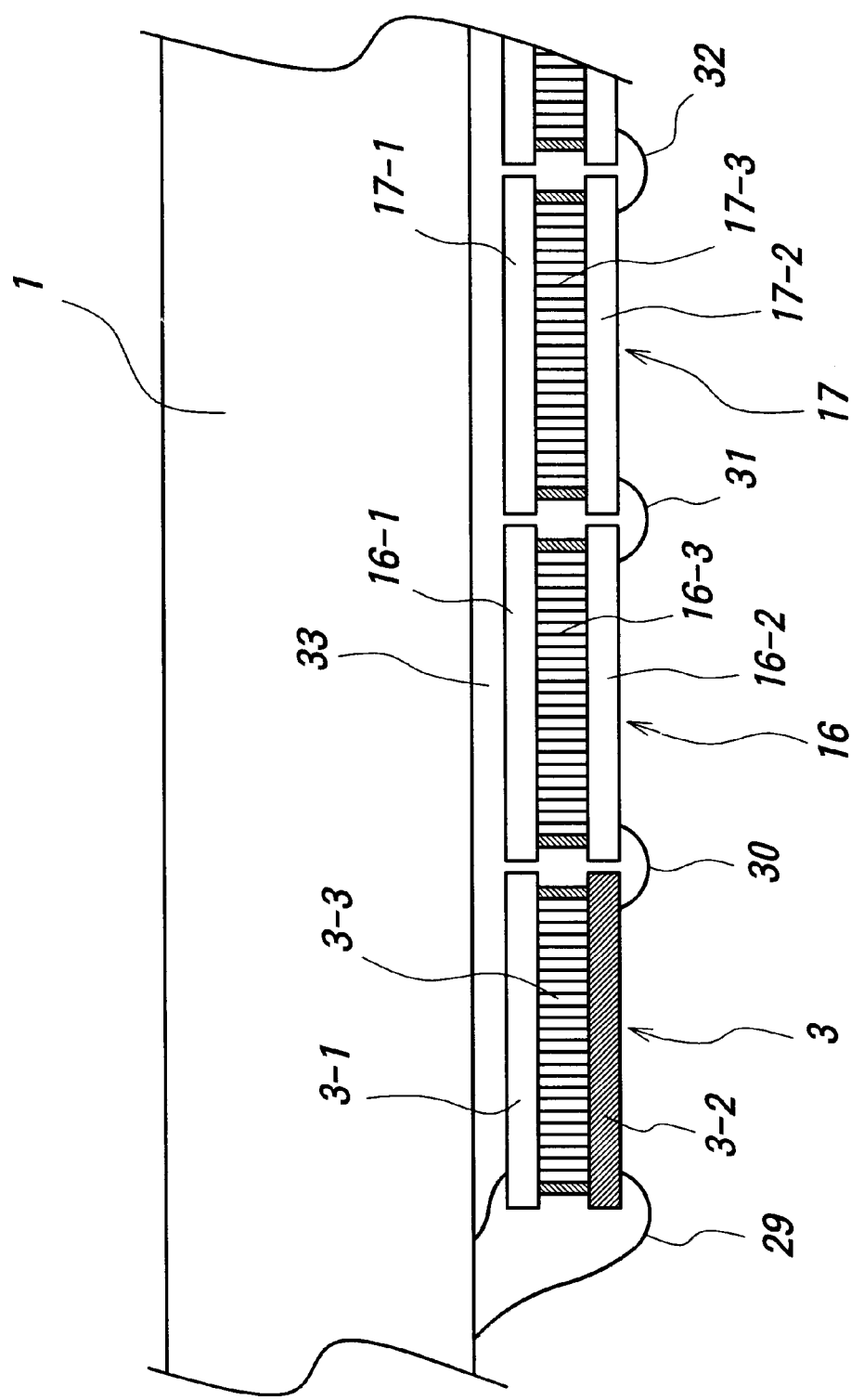
FIG. 2 is a cross-sectional view taken along a line I—I of FIG. 1.

As shown in FIG. 2 corresponding to a cross-sectional view taken along a line I—I of FIG. 1, the panel portion 2 is constituted of panels 16, 17 including: glass plates 16-1, 17-1 acting as light conducting plates; printed boards 16-2, 17-2 mounted with driver IC's opposing to the glass plates 16-1, 17-1; and display elements 16-3, 17-3 each having a predetermined number of pixels, and interposed between the glass plates and printed boards; respectively.

Figure 3:
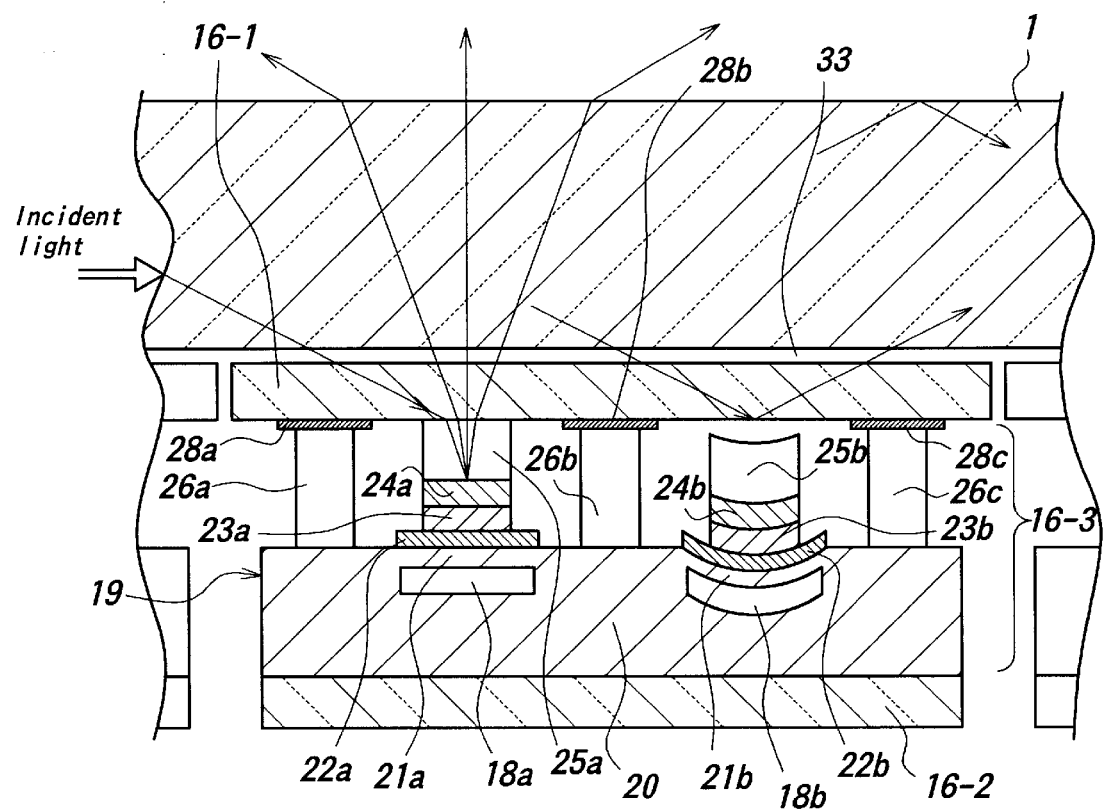
FIG. 3 is a cross-sectional view of a panel to be used in the display.

The details of the panel 16 will be described hereinafter, with reference to FIG. 3. The display element 16-3 is provided opposingly to one plate surface of the glass plate 16-1, i.e., of the light conducting plate 1, and includes a driving part 19 arranged with actuator parts 18a, 18b in number corresponding to a plurality of pixels. Correspondingly to attributions of image signals inputted into the applicable apparatus, there are controlled the displacement motions of the actuator parts 18a, 18b in the contacting/separating directions to/from the glass plate 16-1 acting as a part of the light conducting plate, thereby controlling leaked light-beams in predetermined regions of the light conducting plate 1, to thereby cause the light conducting plate 1 to display an image corresponding to the image signals.

Such as disclosed in the aforementioned JP-A-7-287176 and JP-A-11-194723, the actuator parts 18a, 18b are constructed by forming a substrate 20 constituted of ceramics such as zirconia, with thin-walled parts 21a, 21b and by sequentially forming on the thin-walled parts 21a, 21b, (i) piezoelectric/electro-strictive layers or antiferroelectric layers 22a, 22b such as formed with electrode films on the upper and lower surfaces thereof, respectively, (ii) white scatterer layers 23a, 23b, (iii) colored illuminant layers 24a, 24b, and (iv) contacting layers 25a, 25b, respectively. The glass plate 16-1 is supported by the substrate 20 through a plurality of columns 26a, 26b, 26c, and arranged to be tightly contacted with the light conducting plate 1 such as via silicon oil 33. Arranged between the columns 26a, 26b, 26c and glass plate 16-1 are reflectors or light-absorbing layers 28a, 28b, 28c.

The actuator part 18a corresponds to a light emitting moment or situation of the display element 16-3, in which the piezoelectric/electrostrictive layer or antiferroelectric layer 22a and thin-walled part 21a are upwardly protruded so that the contacting layer 25a contacts with the glass plate 16-1. Thus, those light-beams, having been introduced into the light conducting plate 1 and totally reflected between (i) the inner surface of the light conducting plate 1 positioned at the front surface thereof and (ii) the inner surface of the glass plate 16-1 positioned at the back surface of the glass plate 16-1 itself arranged to be tightly contacted with the light conducting plate 1, permeate up to the surface of the colored illuminant layer 24a via contacting layer 25a. The thus permeated light-beams are turned into scattered light-beams in the color corresponding to the color of the colored illuminant layer 24a, and then passed through the glass plate 16-1, to be finally emitted from the front surface side of the light conducting plate 1.

Contrary, the actuator part 18b corresponds to a light extinguishing moment or situation of the display element 16-3, in which the piezoelectric/electro-strictive layer or antiferroelectric layer 22a and thin-walled part 21a are downwardly retracted so that the contacting layer 25b is separated from the glass plate 16-1. Thus, those light-beams introduced into the light conducting plate 1 advance to the other side surface, while totally reflected between the pertinent inner surface of the light conducting plate 1 and the pertinent inner surface of the glass plate 16-1, in a repeated manner.

Since the basic constitution and function of the display element relating to the present invention have been exemplarily disclosed in the aforementioned JP-A-7-287176 and JP-A-11-194723, the detailed explanation thereof shall be omitted herein.

Referring again to FIG. 2, the frame 3 includes a glass plate 3-1 and a black-coated glass plate 3-2 opposing thereto, so as to form an air layer 3-3 between the glass plate 3-1 and black-coated glass plate 3-2.

Adhering the frame 3 before adhering the panels 16, 17 allows to position the panels 16, 17 and to avoid the light leakage at the periphery of the panel portion 2.

The light conducting plate 1, frame 3 and panels 16, 17 are mutually connected by gaskets 29, 30, 31, 32, such that the silicon oil 33 having the substantially similar refractive index to those of the light conducting plate 1, glass plates 3-1, 16-1, 17-1 is filled into the space surrounded by the light conducting plate 1, frame 3, panels 16, 17 and gaskets 29, 30, 31, 32.

Figure 4:
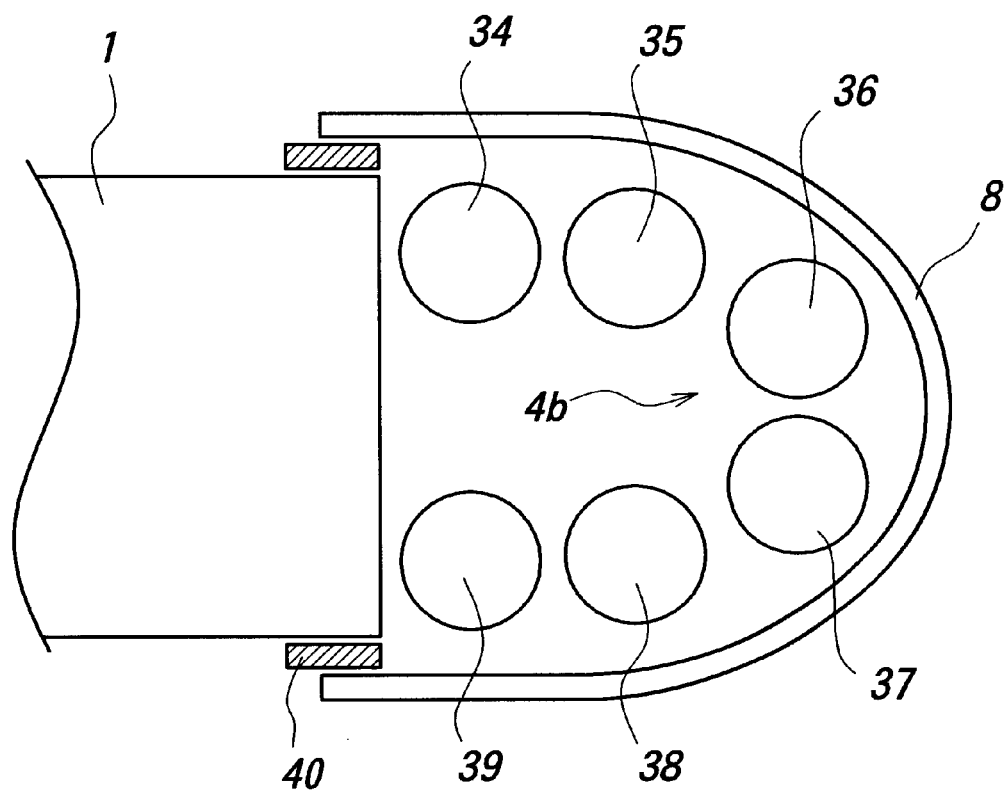
FIG. 4 is a cross-sectional view taken along a line II—II of FIG. 1.
Figure 5:
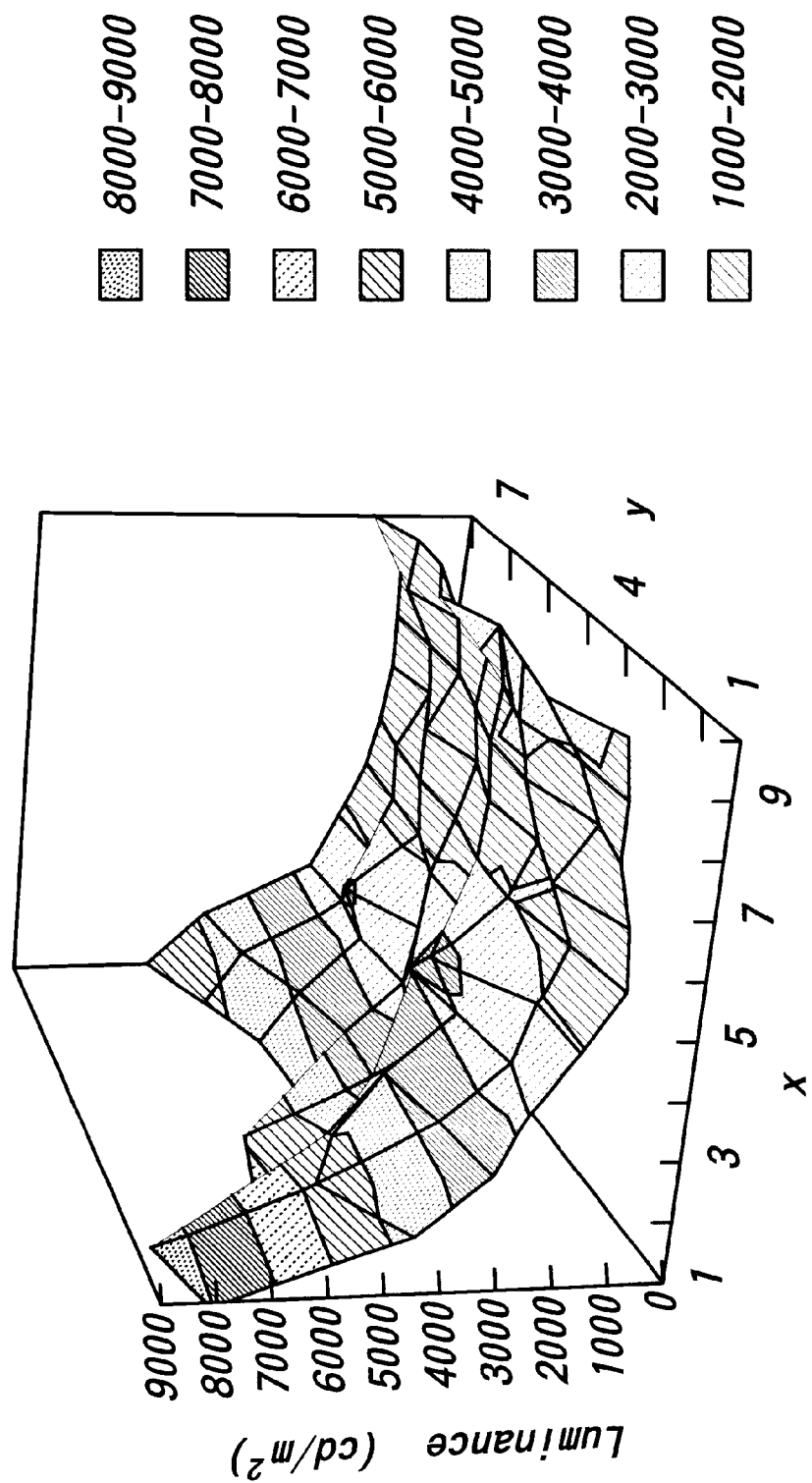
FIG. 5 is a diagram showing a luminance distribution in case of a light conducting plate having a thickness of 1.5 mm and a size of 400 mm×330 mm.
Figure 6:
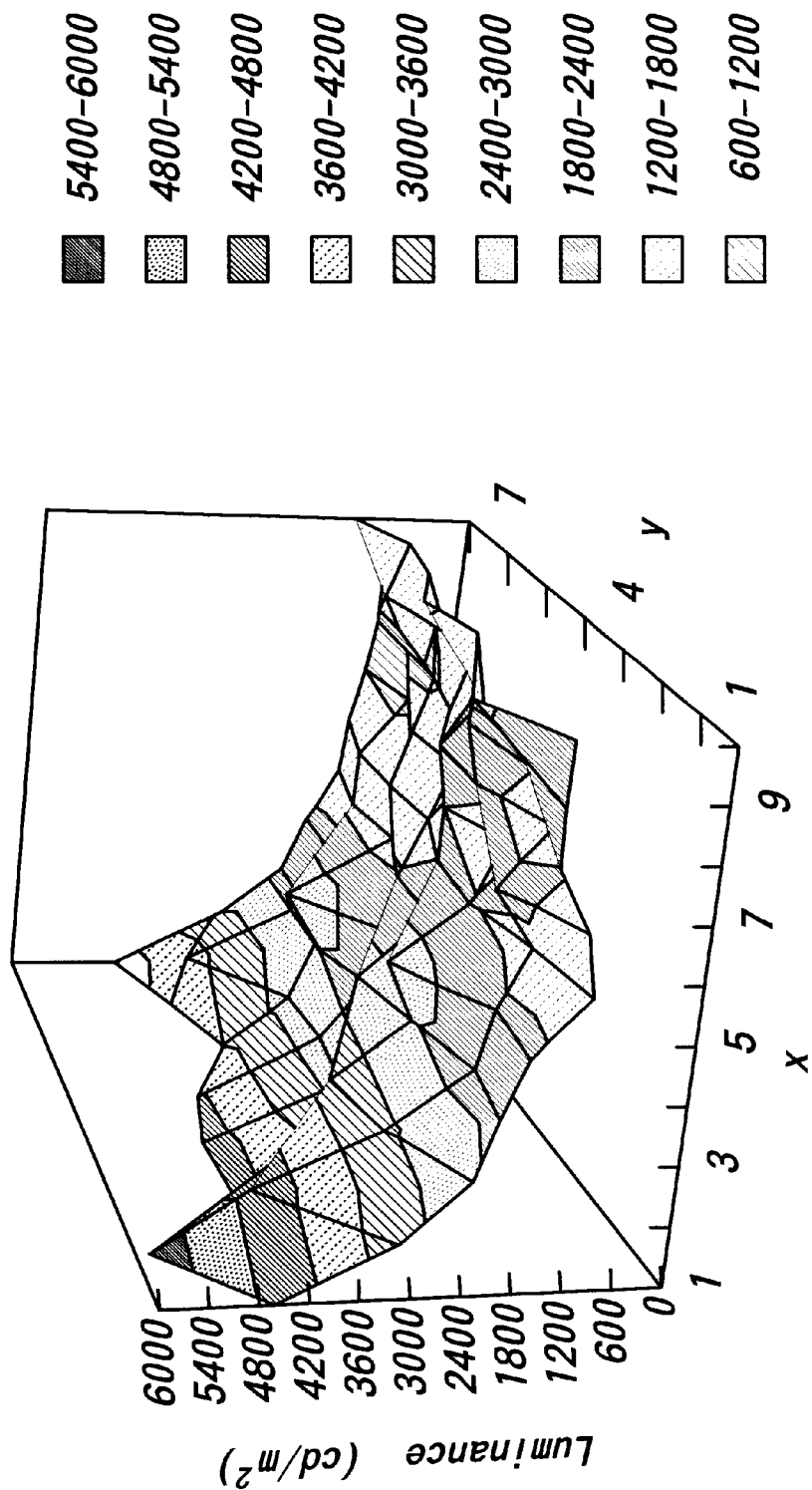
FIG. 6 is a diagram showing a luminance distribution in case of a light conducting plate having a thickness of 2.0 mm and a size of 400 mm×330 mm.
Figure 7:
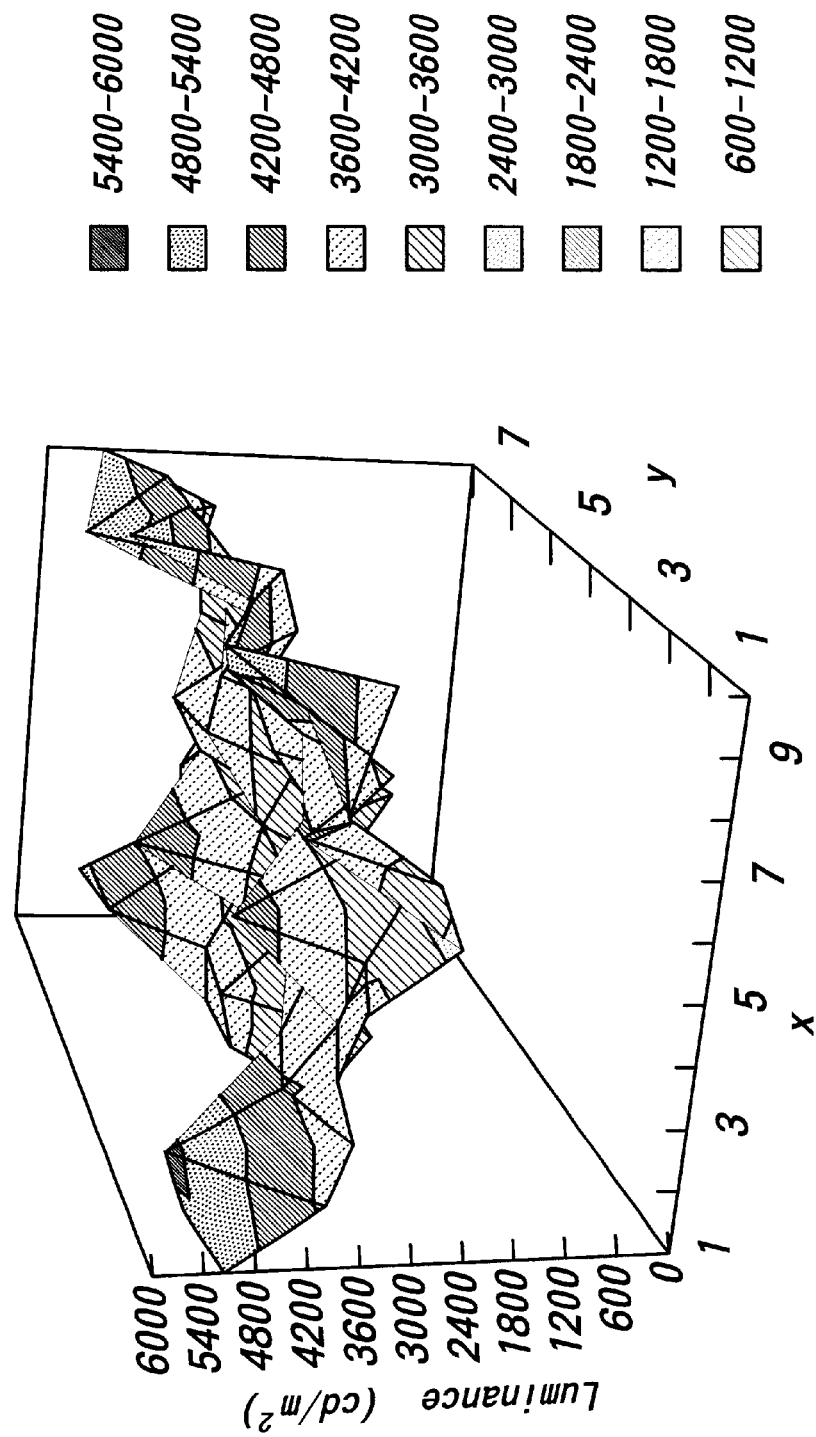
FIG. 7 is a diagram showing a luminance distribution in case of a light conducting plate having a thickness of 5.0 mm and a size of 400 mm×330 mm.
Figure 8:
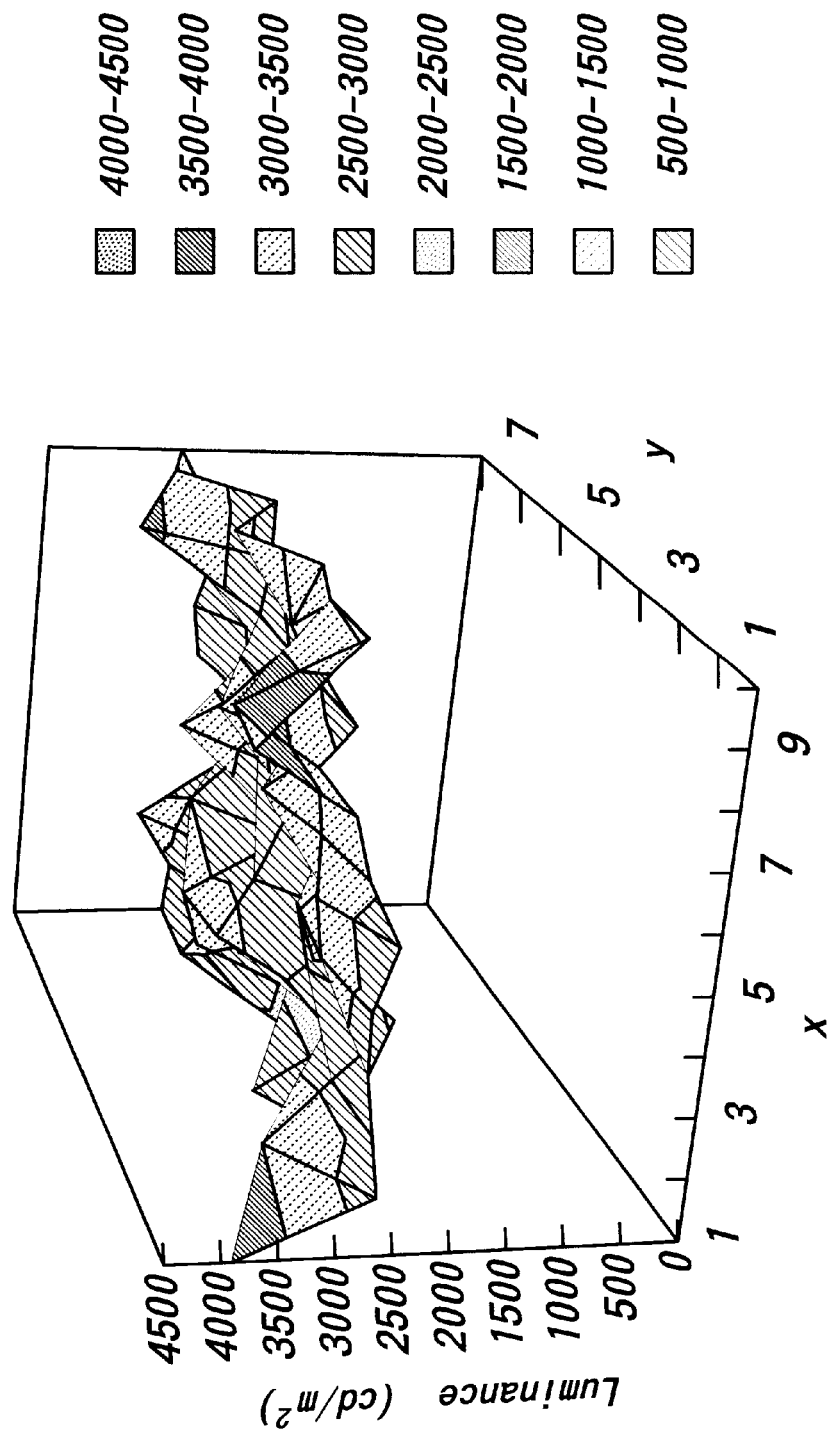
FIG. 8 is a diagram showing a luminance distribution in case of a light conducting plate having a thickness of 10 mm and a size of 400 mm×330 mm.
Figure 9:
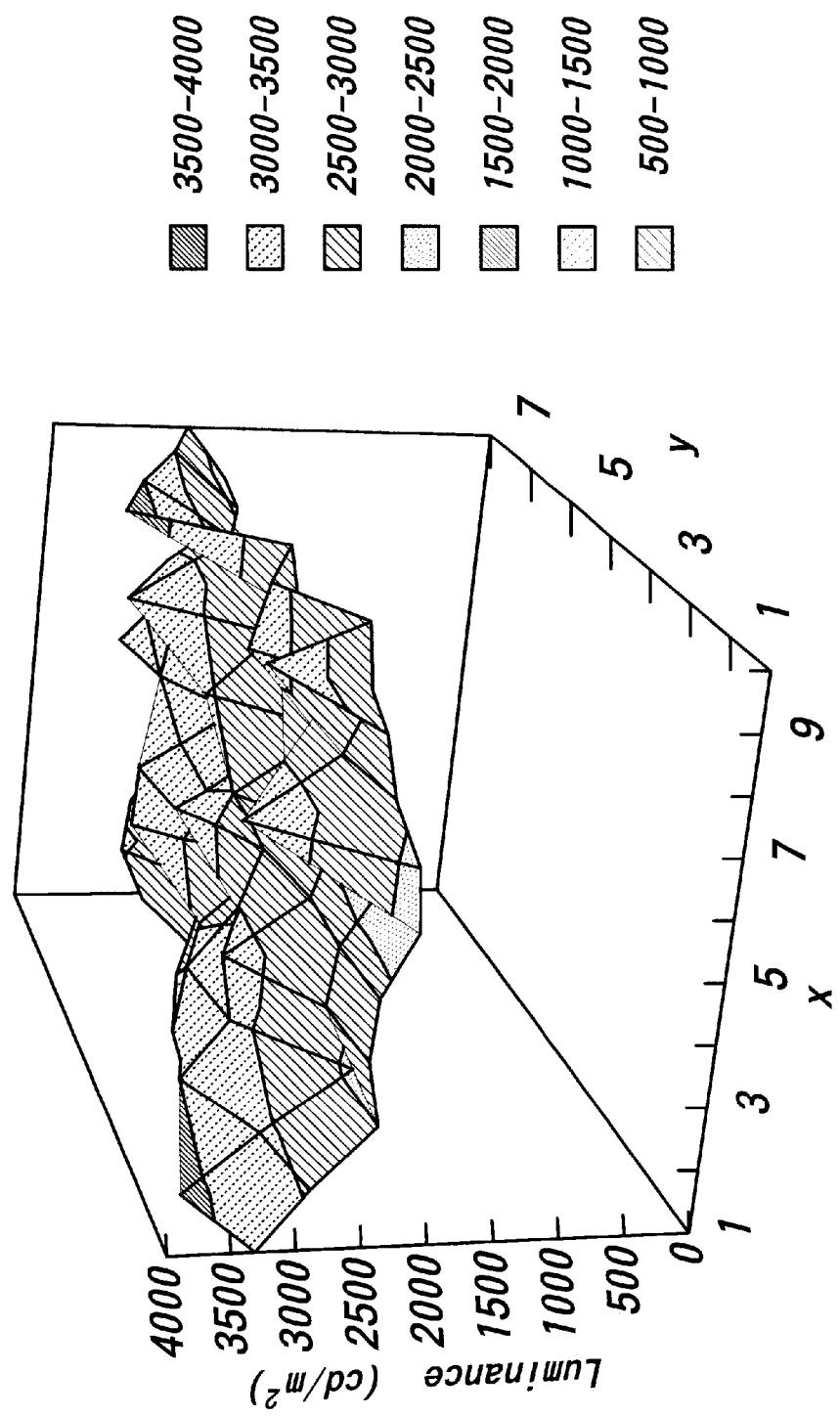
FIG. 9 is a diagram showing a luminance distribution in case of a light conducting plate having a thickness of 30 mm and a size of 400 mm×330 mm.
Figure 10:
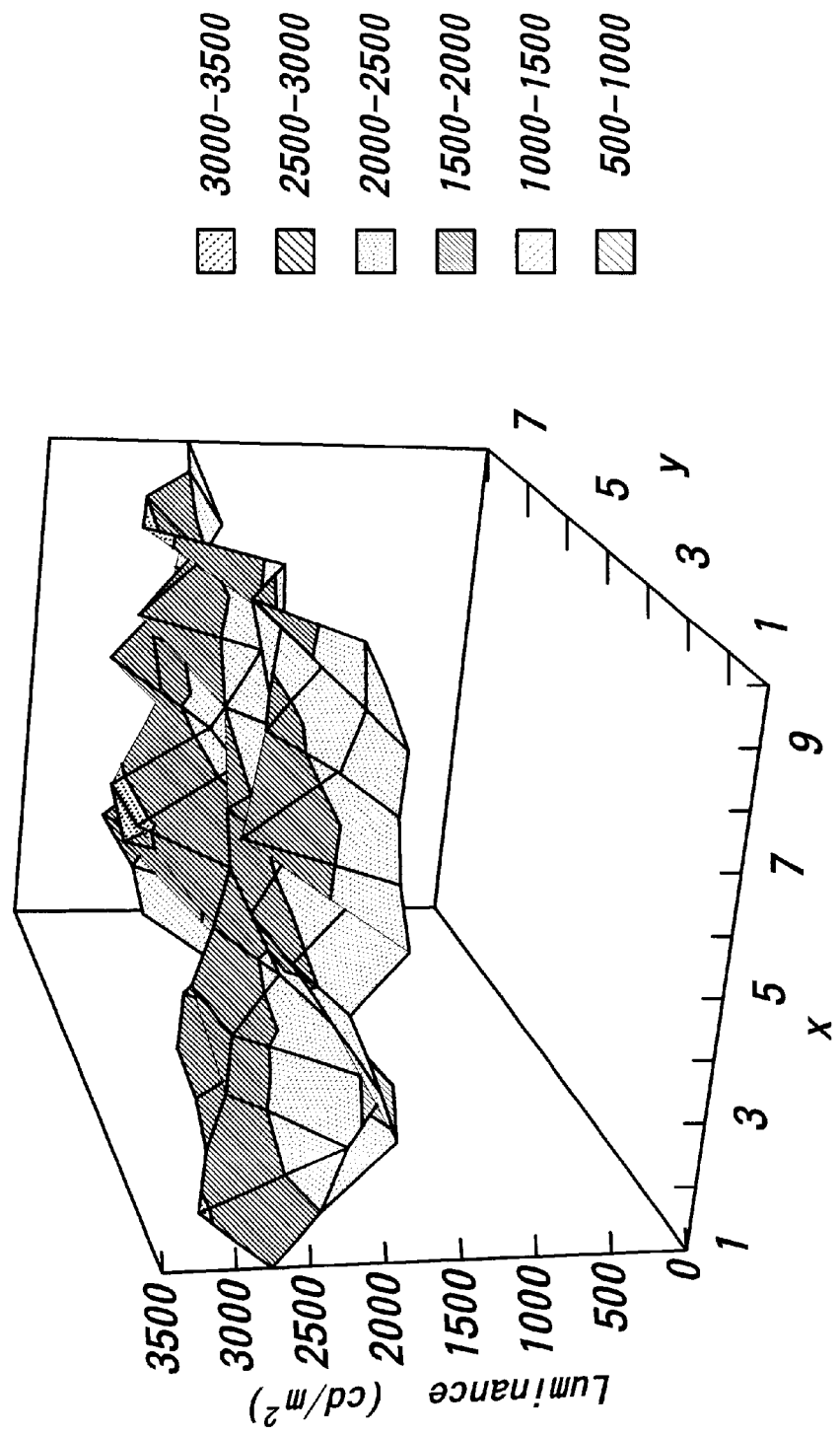
FIG. 10 is a diagram showing a luminance distribution in case of a light conducting plate having a thickness of 50 mm and a size of 400 mm×330 mm.

Reference is now made to FIG. 4 corresponding to a cross-sectional view taken along a line II—II of FIG. 1. The light source 4b includes six pieces of lamps 34, 35, 36, 37, 38, 39. The lamp (light source) includes an incandescent lamp, a deuterium discharge lamp, a mercury lamp, a metal halide lamp, a halogen lamp, a xenon lamp, a tritium lamp, a light emitting diode, a laser, a plasma light source, a hot-cathode tube (or, one arranged with a carbon nano-tube field emitter, instead of a filament hot cathode), a cold-cathode tube, a black light, an infrared-rays emitting light source, and a neon tube. It is possible to adopt one of the lamps 34, 35, 36, 37, 38, 39, as a color-temperature correction lamp.

The reflector 8 has a profile in an outwardly convexed shape formed by straight lines, continuous curved lines, or a combination thereof so as to improve: the ratio of light-beams to be introduced into the light conducting plate; and the ventilation i.e., heat dissipation. The space surrounded by the profile of the reflector 8 and one side surface of the light conducting plate 1 has those maximum lengths which are 3 or less times the thickness of the light conducting plate 1, in both of the direction parallel to one of the plate surfaces of the light conducting plate 1 and the direction parallel to the side surface of the light conducting plate 1. In this case, the reflector 8 is a trough-shaped one. The reflector 8 is exemplarily constituted of aluminum, and adhered with a white scattering sheet or reflecting sheet (mirror) at the inner surface of the reflector 8.

Interposed between the light conducting plate 1 and reflector 8 is a silver reflection film 40. This silver reflection film 40 is to prevent light leakage from between the light conducting plate 1 and reflector 8, and serves as a cushioning material.

The air-cooling fans 12a, 12b, 13a, 13b, 14a, 14b, 15a, and 15b change the revolution numbers thereof, to thereby adjust the temperatures within the reflectors 8, 9, 10, 11 (near the light sources 4a, 4b, 5a, 5b, 6a, 6b, 7a, and 7b) to appropriate values, respectively.

The optical system of the display according to the present invention is constituted of the light conducting plate 1, the light sources 4a, 4b, 5a, 5b, 6a, 6b, 7a, 7b and the reflectors 8, 9, 10, 11. The light conducting plate 1 is directly introduced with not only the light-beams from the light sources 4a, 4b, 5a, 5b, 6a, 6b, 7a, 7b but also the light-beams reflected by the reflectors 8, 9, 10, 11, thereby allowing to relatively increase the ratio of the introduced light-beams into the light conducting plate 1 relative to the exiting light-beams from the light sources 4a, 4b, 5a, 5b, 6a, 6b, 7a, 7b. As a result, even when those exiting light-beams from the light sources 4a, 4b, 5a, 5b, 6a, 6b, 7a, 7b are relatively weak, it is possible to fill light-beams into the light conducting plate 1 so as to constitute a novel optical system suitable for the display element relating to the present invention.

There will be explained hereinafter the relationship between the thickness of the light conducting plate and the diagonal length of the light conducting plate or its displaying area.

FIG. 5 through FIG. 10 are diagrams showing luminance distributions in case of light conducting plates having thicknesses of 1.5 mm, 2.0 mm, 5.0 mm, 10 mm, 30 mm and 50 mm, respectively, and all having the same sizes of 400 mm×330 mm (thus, the diagonal length is 518 mm). At this time, there was adopted each pixel based on a white scatterer having a numerical aperture of 17%.

In each of FIGS. 5 to 10, light was injected from one side surface having the length of 400 mm of the light conducting plate, the reflector had a semicircular profile shape to be described later, and the remaining side surfaces of the light conducting plate were adhered with silver reflection films, respectively. In FIGS. 5 to 10, the x-direction corresponds a direction parallel to the 330-mm-length side surface, the y-direction corresponds to a direction parallel to the 400-mm-length side surface, and the values in the x-direction and y-direction represent criteria of these lengths. Further, the luminance (cd/m²) is plotted in the z-direction perpendicular to the x-direction and y-direction.

There will be hereinafter evaluated the uniformity of luminance. To obtain an excellent uniformity of luminance, it is enough for the light conducting plate to have a thickness of a first value or more such that the light introduced into one side surface of the light conducting plate straightly advances up to the other side surface. As understood from FIGS. 5 to 8, although the in-plane luminance variance relative to the averaged in-plane luminance becomes not more than 0.2 less to thereby attain an excellent luminance uniformity when the thickness is 10 mm, the in-plane luminance variance relative to the averaged in-plane luminance becomes relatively large to thereby fail to obtain an excellent luminance uniformity in case of other thicknesses, i.e., less than 10 mm. As a result, the first value is determined to be 10 mm.

Meanwhile, when the thickness of the light conducting plate further increases, there is decreased the number of times the light introduced into one side surface of the light conducting plate repeats reflection. This decreases the number of times the introduced light reaches the panel, so that the averaged luminance is lowered. To avoid such a situation, the thickness of the light conducting plate is preferably less than a second value. As understood from FIGS. 9 and 10, although the in-plane luminance variance relative to the averaged in-plane luminance becomes not more than 0.2 to thereby attain an excellent luminance uniformity when the thickness is 30 mm, the averaged luminance itself is lowered while the in-plane luminance variance relative to the averaged in-plane luminance is excellent when the thicknesses is 50 mm. As a result, the second value is determined to be 50 mm.

Thus, when the diagonal length of the light conducting plate is 518 mm, the thickness of the light conducting plate is preferably set to be not less than 10 mm and less than 50 mm. This corresponds to a value which is not less than 0.01 and less than 0.1 times of the diagonal length of the light conducting plate.

There will be explained hereinafter a situation where not less than two light sources are arranged at predetermined intervals therebetween, along one side surface of the light conducting plate, with reference to FIG. 11.

Figure 11:
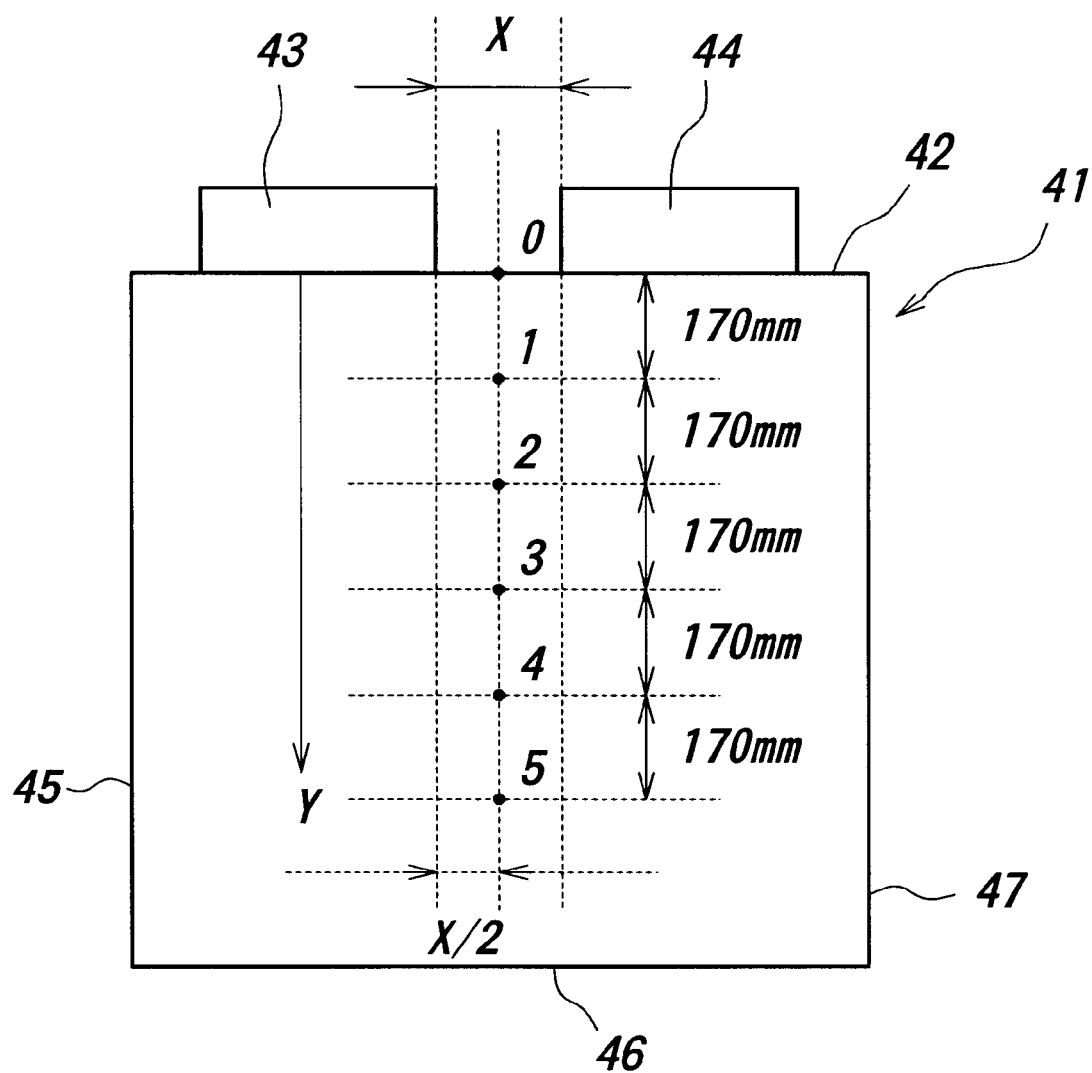
FIG. 11 is a view for explaining a situation for arranging two or more light sources at predetermined intervals therebetween along one side surface of a light conducting plate.

FIG. 11 shows a light conducting plate 41 having a size of 1,000 mm×1,025 mm, and a thickness of 50 mm. The light conducting plate 41 has a side surface 42 having a length of 1,000 mm. This side surface 42 forms spaces in cooperation with reflectors 43, 44 having semicircular profile shapes, respectively, and arranged at a distance "X" therebetween. Each space is arranged therein with four pieces of white cold-cathode tubes each having a diameter of 3 mm. Note, the side surfaces 45 to 47 are arranged with no reflectors.

Reference numerals 0 to 5 on the light conducting plate 41 represent measuring points of luminance, respectively, such that the measuring point "0" is located at a position corresponding to the middle point of the interval between the reflectors 43, 44 separated from the side surface 42 by 0 mm, while the measuring points "1" to "5" are located at positions separated from the measuring point "0" by 170 mm, 340 mm, 510 mm, 680 mm and 850 mm, respectively, in the direction parallel to the side surfaces 45, 47.

The thus obtained relationship between the distance "X" and luminance is shown in Table 1, FIG. 12 and FIGS. 13A to 13D. Note, reference numerals 0 to 5 in Table 1 correspond to the measuring points "0" to "5", respectively, and luminances corresponding to the distance "X" and measuring points are represented in cd/m².

TABLE 1

| x (mm) | 0 | 1 | 2 | 3 | 4 | 5 |
|---|---|---|---|---|---|---|
| x = 2 | 797 | 342 | 115 | 57 | 40 | 38 |
| x = 3 | 732 | 342 | 115 | 57 | 40 | 39 |
| x = 4 | 663 | 344 | 116 | 57 | 40 | 38 |
| x = 5 | 623 | 343 | 114 | 58 | 41 | 39 |
| x = 6 | 554 | 337 | 115 | 58 | 40 | 38 |
| x = 7 | 505 | 332 | 115 | 58 | 40 | 38 |
| x = 8 | 461 | 331 | 115 | 56 | 40 | 38 |
| x = 9 | 415 | 317 | 112 | 56 | 41 | 40 |
| x = 10 | 376 | 305 | 109 | 56 | 40 | 38 |
| x = 11 | 346 | 297 | 109 | 55 | 40 | 39 |
| x = 12 | 328 | 299 | 111 | 57 | 41 | 39 |

Figure 12:
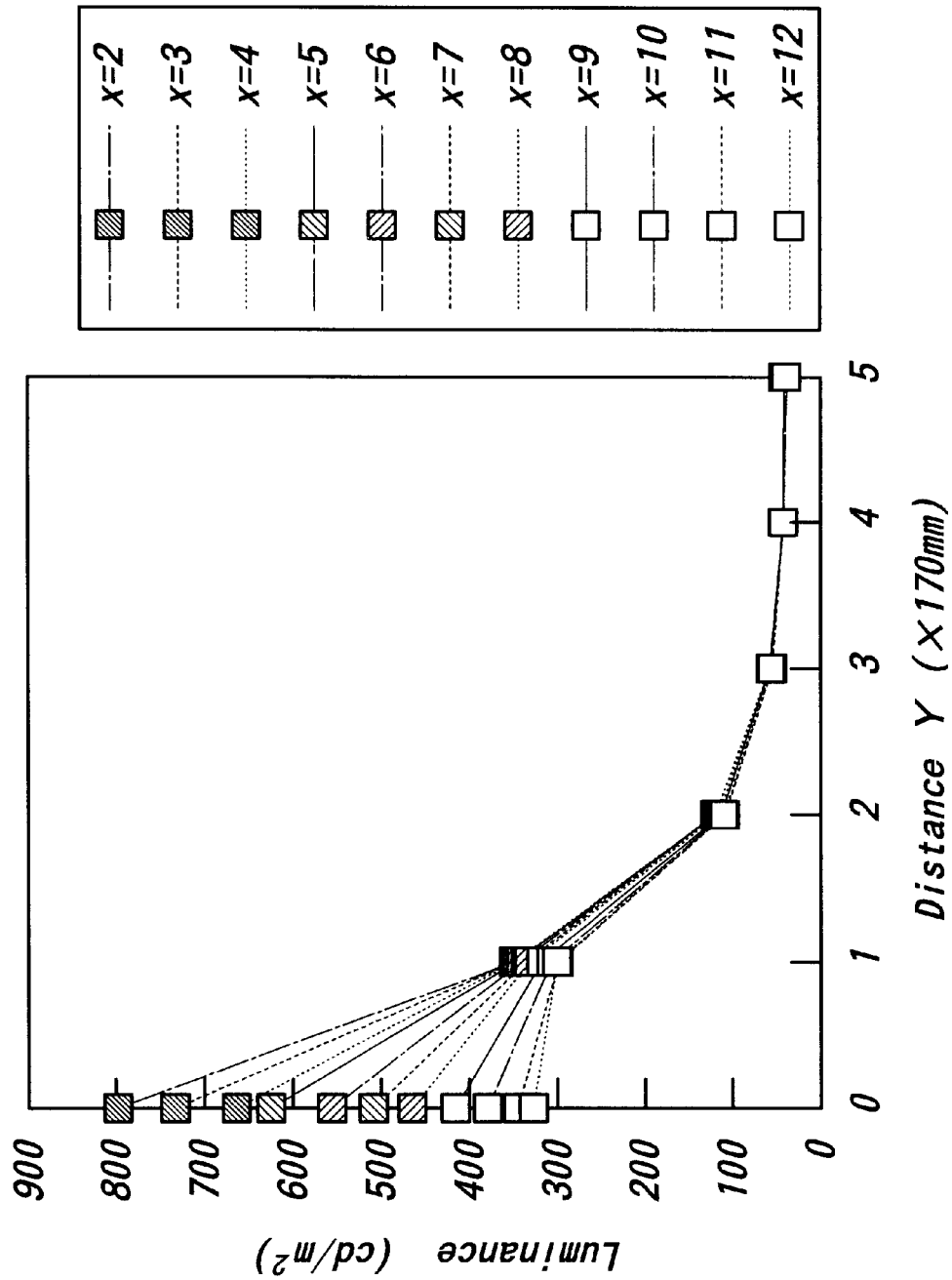
FIG. 12 is a diagram showing a relationship between: a distance between light sources: and luminance.
Figure 13A:
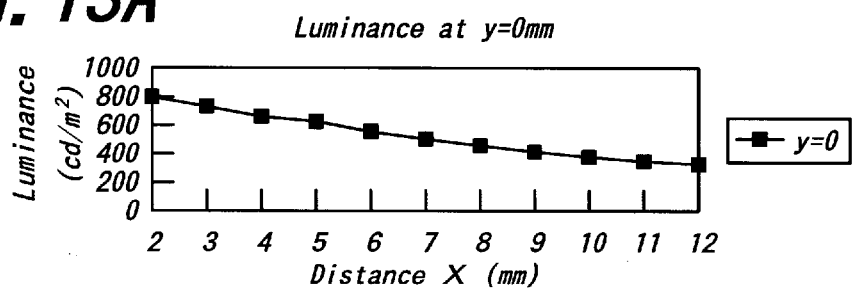
FIGS. 13A to 13D are diagrams each showing a relationship between a distance x and luminance, where (A) y=0 mm, (B) y=170 mm, (C) y=340 mm, and (D) y=510 mm, 680 mm, 850 mm.
Figure 13B:
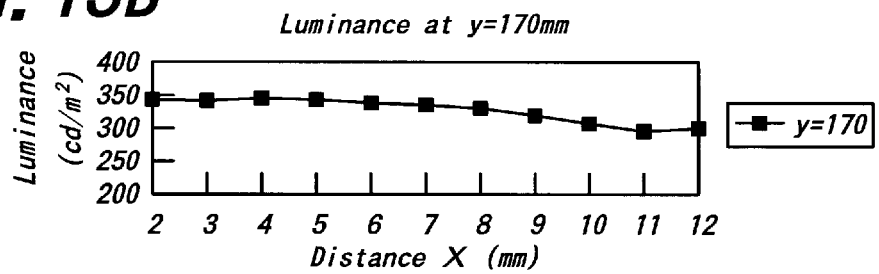
Figure 13C:
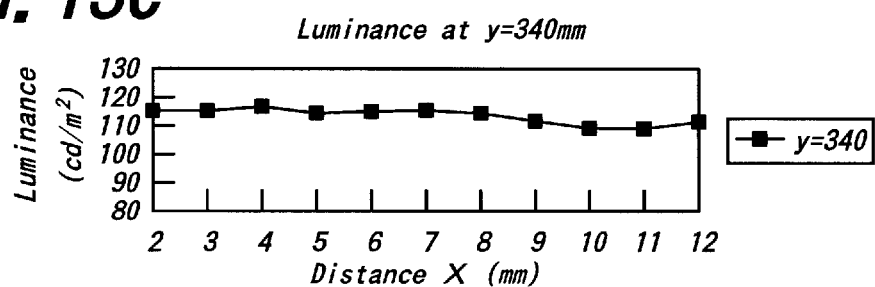
Figure 13D:
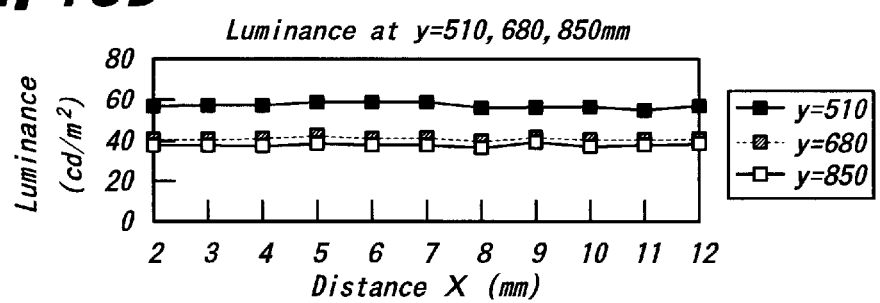

As shown in FIG. 12, even when the distance "X" between the reflectors 43, 44 is large, the affection of the distance "X" is nullified as the distance "Y" between the outer periphery of the panel and the side surface of the light conducting plate is increased. However, increasing the distance "Y" decreases an effective displaying surface area. Thus, it is required to find out the distances "X" and "Y" for simultaneously ensuring an excellent luminance characteristic and a sufficient effective displaying surface area. Attention is now directed to FIG. 13B where the distance "Y" is 170 mm. The reason is that the luminance is monotonously decreased relative to the distance "X" when the distance "Y" is 0 mm as understood from FIG. 13A, thereby making it difficult to find out appropriate distances "X" and "Y" as practical design values. Contrary, when the distance "Y" is 170 mm, there is maintained about 90% of the luminance in case of the distance "X" of 0 mm, until the distance "X" reaches 8 mm. This corresponds to a fact that the distance "X" is 0.05 or less times the shortest distance (corresponding to the distance "Y") between the outer periphery of the panel portion and the side surface 42 because 8 mm/170 mm≈0.05.

Figure 14:
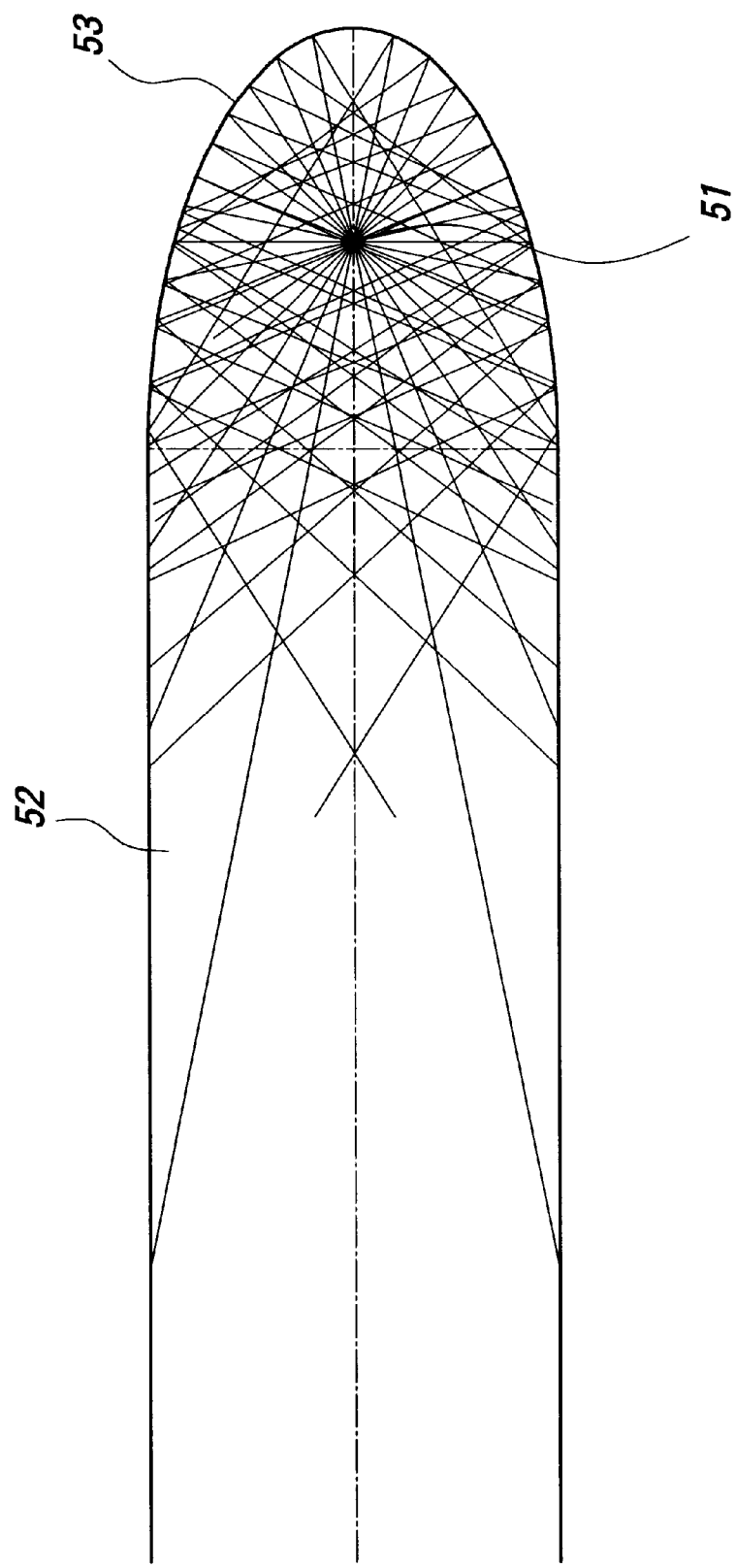
FIG. 14 is a view showing a light conducting plate and a reflector forming a space in cooperate with a side surface of the light conducting plate, and having a semi-ellipse profile shape.

There will be explained hereinafter the profile shape of the reflector. FIG. 14 is a view showing a light conducting plate and a reflector forming a space in cooperation with a side surface of the light conducting plate, and which has a semi-ellipse profile shape. In this case, those light-beams emitted from a light source 51 arranged within the space are directly introduced into a light conducting plate 52 as indicated by solid lines and reflected by an inner surface of a reflector 53 and then introduced into the light conducting plate 52.

Figure 15:
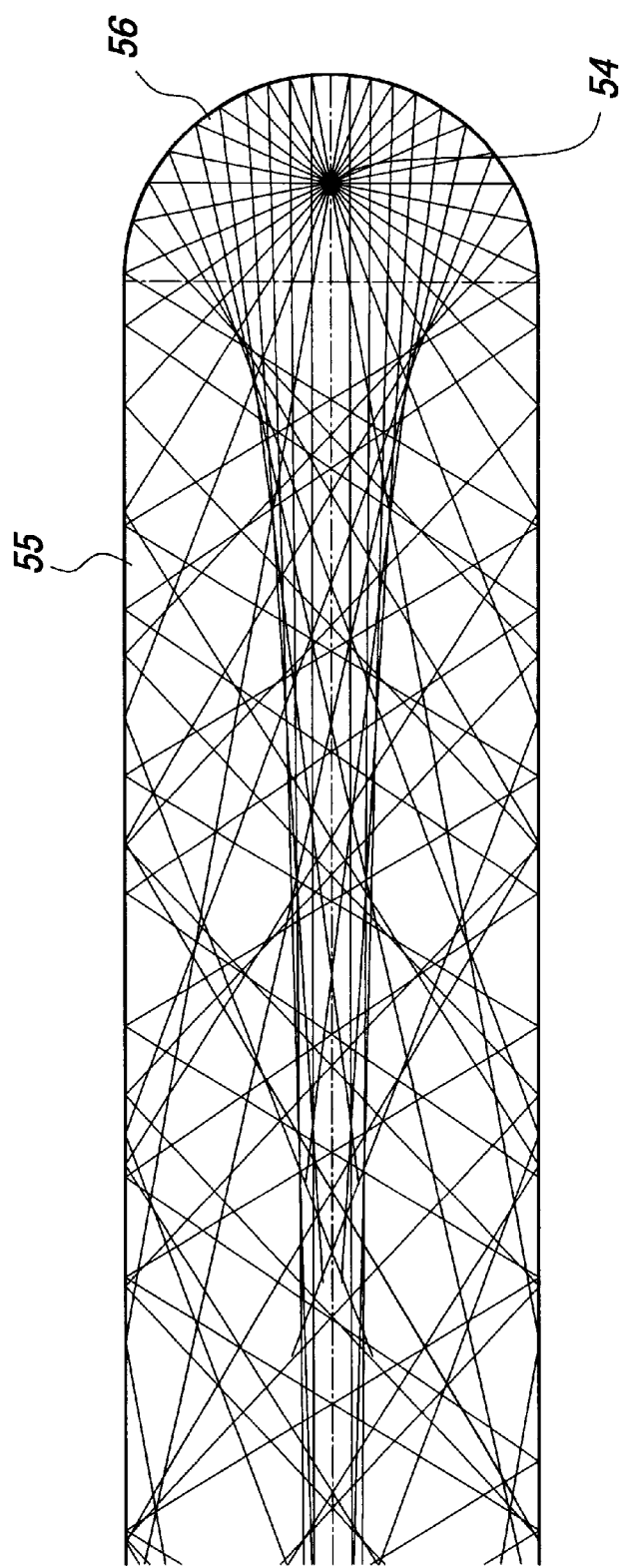
FIG. 15 is a view showing a light conducting plate and a reflector forming a space in cooperation with a side surface of the light conducting plate, and having a semicircular profile shape.

FIG. 15 is a view showing a light conducting plate and a reflector which forming a space in cooperation with a side surface of the light conducting plate, and which has a semicircular profile shape. In this case, those light-beams emitted from a light source 54 arranged within the space are directly introduced into a light conducting plate 55 as indicated by solid lines and reflected by an inner surface of a reflector 56 and then introduced into the light conducting plate 55.

Figure 16:
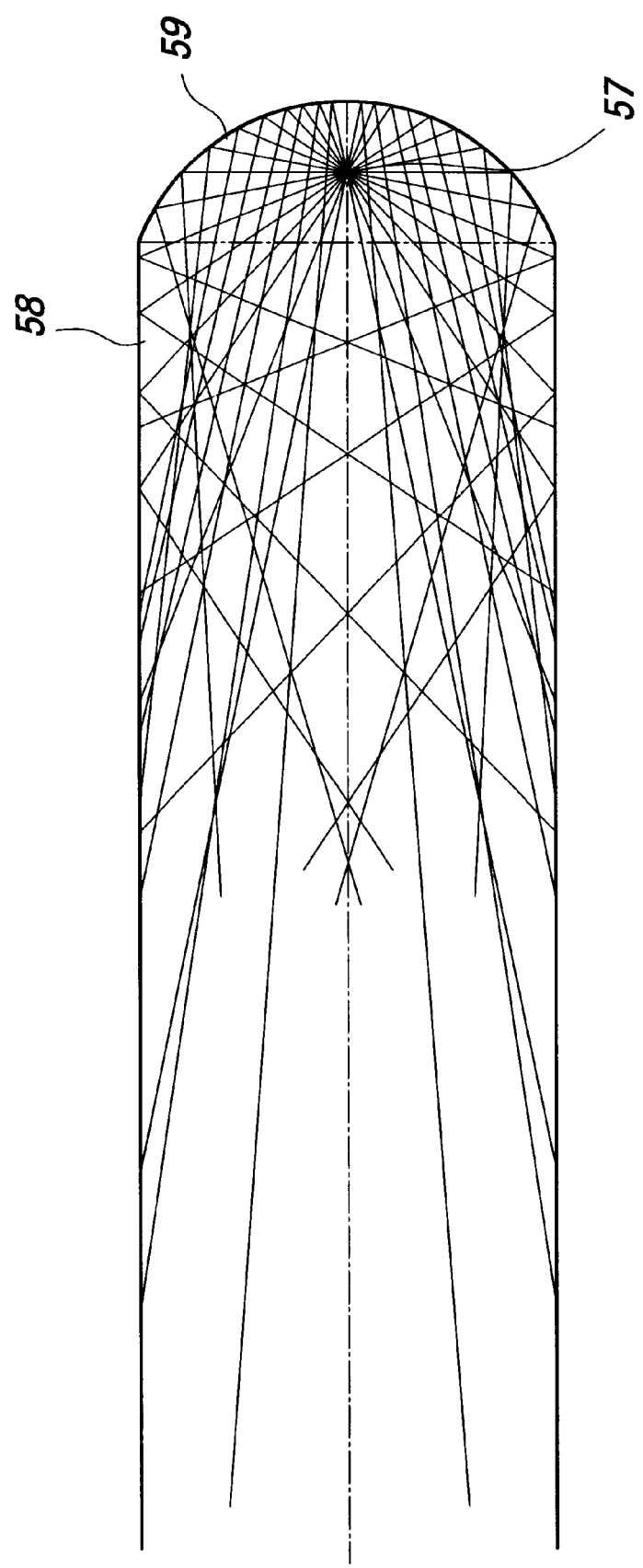
FIG. 16 is a view showing a light conducting plate and a reflector forming a space in cooperation with a side surface of the light conducting plate, and having an arcuate profile shape.

FIG. 16 is a view showing a light conducting plate and a reflector forming a space in cooperation with a side surface of the light conducting plate, and which has an arcuate profile shape. In this case, those light-beams emitted from a light source 57 arranged within the space are directly introduced into a light conducting plate 58 as indicated by solid lines and reflected by an inner surface of a reflector 59 and then introduced into the light conducting plate 58.

Figure 17:
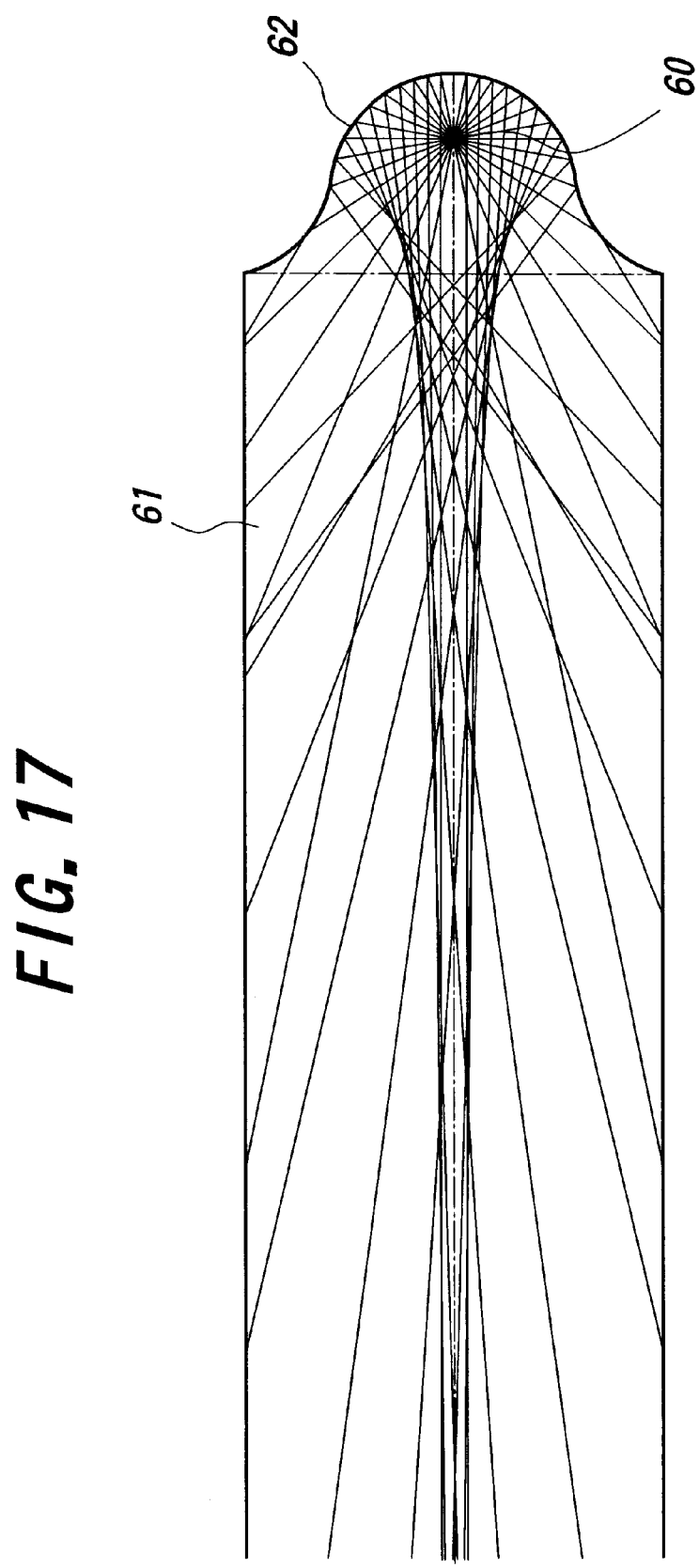
FIG. 17 is a view showing a light conducting plate and a reflector forming a space in cooperation with a side surface of the light conducting plate, and having a curved profile shape.

FIG. 17 is a view showing a light conducting plate and a reflector forming a space in cooperation with a side surface of the light conducting plate, and which has a curved profile shape. In this case, those light-beams emitted from a light source 60 arranged within the space are directly introduced into a light conducting plate 61 as indicated by solid lines and reflected by an inner surface of a reflector 62 and then introduced into the light conducting plate 61.

Figure 18:
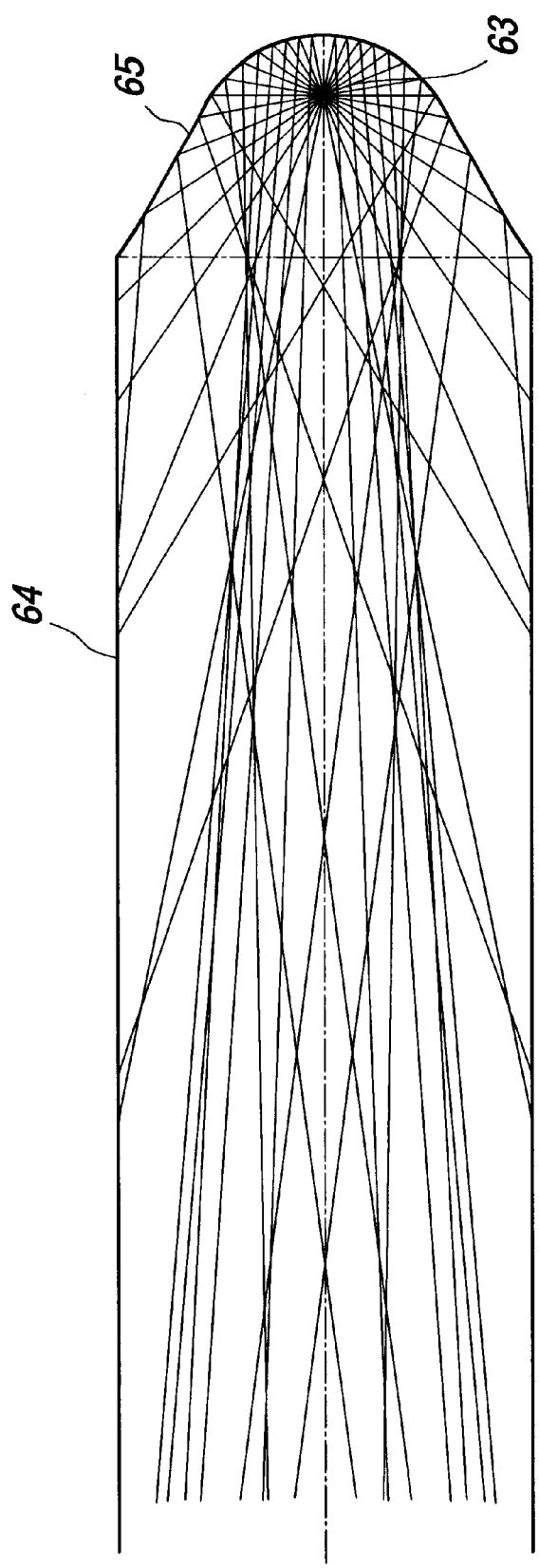
FIG. 18 is a view showing a light conducting plate and a reflector forming a space in cooperation with a side surface of the light conducting plate, and having a substantially triangular profile shape.

FIG. 18 is a view showing a light conducting plate and a reflector forming a space in cooperation with a side surface of the light conducting plate, and which has a substantially triangular profile shape. In this case, those light-beams emitted from a light source 63 arranged within the space are directly introduced into a light conducting plate 64 as indicated by solid lines and reflected by an inner surface of a reflector 65 and then introduced into the light conducting plate 64.

Figure 19:
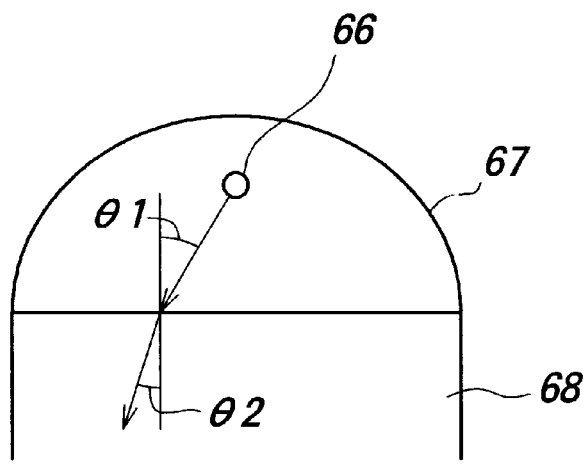
FIG. 19 is a diagram for explaining angle dependencies of an incident light ratio and an exiting light quantity, in case of adopting each of the reflectors shown in FIGS. 14 to 18.
Figure 21:
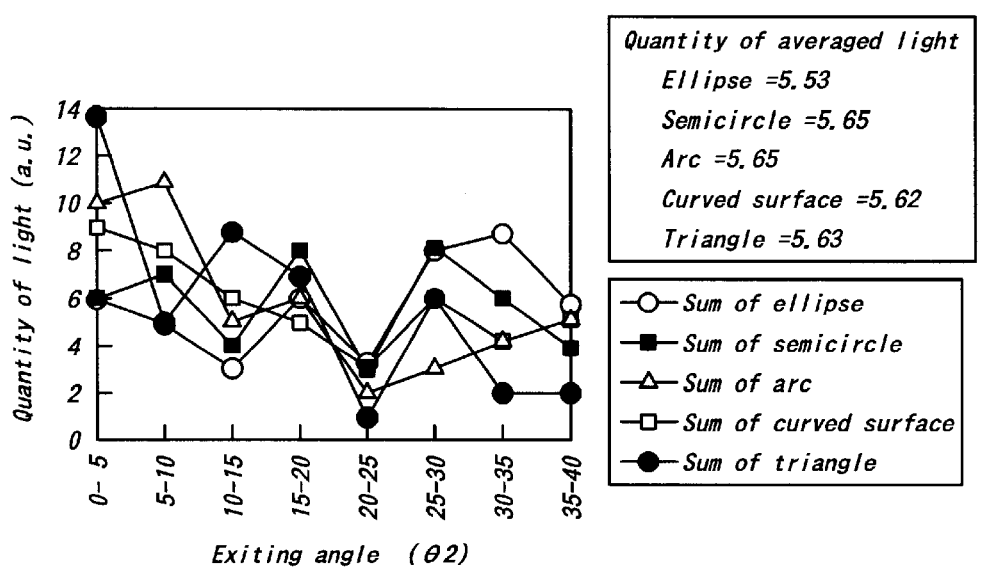
FIG. 21 is a diagram showing an exiting light quantity relative to an exiting angle.

FIG. 19 is a diagram for explaining angle dependencies of an incident light ratio and an exiting light quantity, in case of adopting each of the reflectors shown in FIGS. 14 to 18. In this case, obtained by simulation based on CAD are a relationship between (i) an angle θ1, at which the light-beams from a light source 66 enters a side surface of a light conducting plate 68, directly or after reflected by a reflector 67, and (ii) an incident light ratio, and a relationship between an angle θ2 of the exiting light and a quantity (a.u.) of the exiting light. The result obtained in this way is shown in FIGS. 21 and 22. In each case, the reflectivity at the reflector 67 is 0.97.

Figure 20:
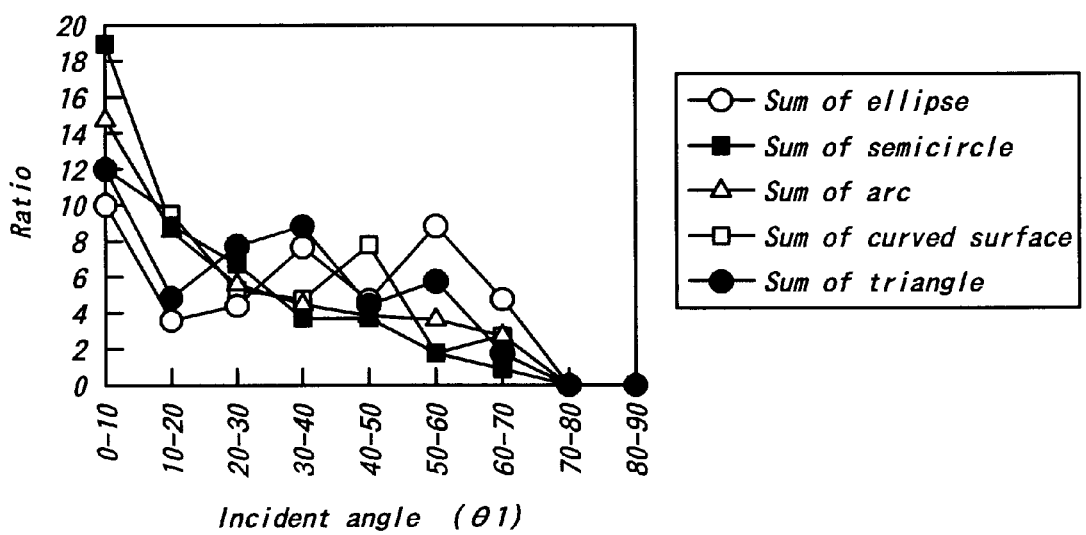
FIG. 20 is a diagram showing an incident light ratio relative to an incident angle.

As understood from FIG. 20, when the profile shape of the reflector 67 is substantially triangular or arcuate, the light ratio entering the side surface of the light conducting plate 68 substantially perpendicularly thereto is increased as compared with a situation where other profile shapes are selected. Thus, the substantially triangular and arcuate profile shapes are advantageous from a viewpoint of luminance uniformity.

As further understood from FIG. 21, when the profile shape of the reflector 67 is arcuate, the light-beams reach farther points, and the total light quantity becomes relatively high. Further, when the profile shape of the reflector 67 is substantially triangular, there is increased a ratio of exiting light-beams approximating parallel light-beams. This is thus advantageous, when the light conducting plate 68 is relatively large sized. Note, the maximum total light quantity is obtained, when the profile shape of the reflector 67 is semicircular. Moreover, the behavior of exiting light-beams in case of the semi-ellipse profile shape of the reflector 67 is substantially the same as the semicircular profile shape of the reflector 67.

There will be explained hereinafter an electric power, luminance and efficiency of a light source. Shown in Table 2 is the relationship between electric power, luminance and efficiency, in the case of arranging two pieces of hot-cathode tubes in a space defined by a light conducting plate and a reflector.

TABLE 2

| Electric Power (W) | Luminance (cd/m$^2$) | Efficiency |
|---|---|---|
| 200 | 328.7 | 1.64 |
| 272 | 368.1 | 1.39 |
| 328 | 388.1 | 1.18 |
| 400 | 418.2 | 1.05 |

As shown in Table 2, as the electric power increases, the efficiency is deteriorated. The reason is that, when the number of hot-cathode tubes is increased, those incident light-beams from the backward hot-cathode tube are intercepted by the forwardly arranged other hot-cathode tube. To increase the incident efficiency of the backward hot-cathode tube, i.e., the backward light source, as high as possible, there was conducted an experiment adopting: reflectors of various profile shapes; and light entrance surfaces thicker than the thickness of the light conducting plate.

There will be explained hereinafter a situation for arranging a single piece of hot-cathode tube of a type for mutually bonding two pieces of glass tubes by a bridging technique, such as a twin fluorescent lamp manufactured by Matsushita Electric Industrial Co.

Figure 22A:
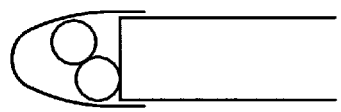
FIGS. 22A to 22C are diagrams each explaining a light-source arrangement in case of arranging a single light source.
Figure 22B:
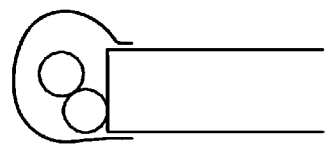
Figure 22C:
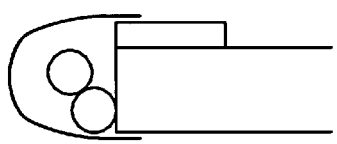

Shown in Table 3 in this concern are luminances in those situations where the profile shape of the reflector is semi-ellipse (FIG. 22A) that length of the space surrounded by the reflector and the light conducting plate, which is in the thickness direction of the light conducting plate, is longer than the thickness of the light conducting plate (FIG. 22B) and the light entrance surface is made larger than the thickness of the light conducting plate (FIG. 22C).

TABLE 3

| | Open End Surface (cd/m$^2$) | Reflecting End Surface (cd/m$^2$) |
|---|---|---|
| A | 172 | 337 |
| B | 180 | 343 |
| C | 195 | 353 |

In Table 3, characters "A" to "C" correspond to the configurations of FIG. 22A to FIG. 22C, respectively. Further, the "open end surface" means that no reflecting surfaces are provided at the end surface opposing to the end surface arranged with the light source, while the "reflecting end surface" means that a reflecting surface is provided at the end surface opposing to the end surface arranged with the light source.

Figure 23A:
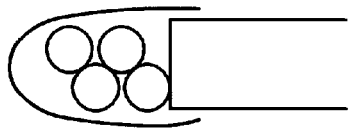
FIGS. 23A to 23I are diagrams each explaining a light-source arrangement in case of arranging two light sources.
Figure 23B:
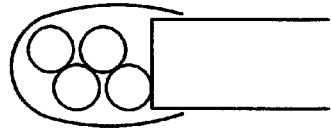
Figure 23C:
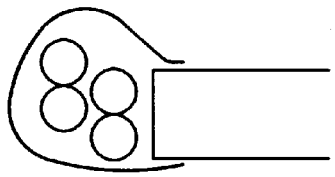
Figure 23D:
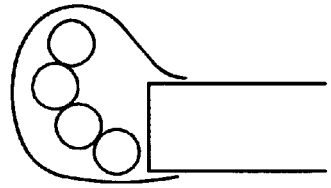
Figure 23E:
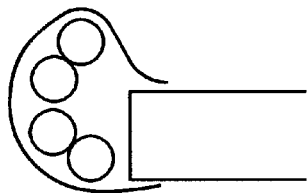
Figure 23F:
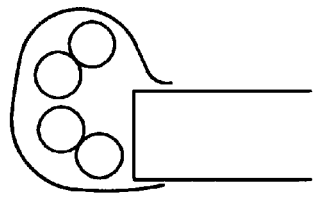
Figure 23G:
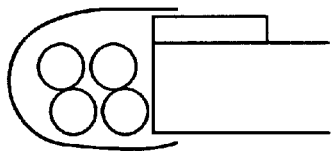
Figure 23H:
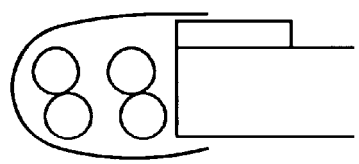
Figure 23I:
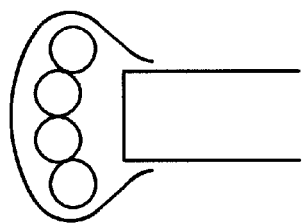

There will be explained hereinafter a situation for providing two pieces of hot-cathode tubes. Shown in Table 4 in this concern are luminances in those situations where the profile shape of the reflector is semi-ellipse (FIG. 23A) that length of the space surrounded by the reflector and the light conducting plate, which is in the thickness direction of the light conducting plate, is longer than the thickness of the light conducting plate (FIGS. 23B to 23F), the light entrance surface is made larger than the thickness of the light conducting plate (FIGS. 23G and 23H) and the profile shape of the reflector is substantially sectorial (FIG. 23I).

TABLE 4

| | Open End Surface (cd/m$^2$) | Reflecting End Surface (cd/m$^2$) |
|---|---|---|
| A | 208 | 395 |
| B | 221 | 407 |
| C | 225 | 424 |
| D | 270 | 481 |
| E | 264 | 479 |
| F | 261 | 477 |
| G | 271 | 463 |
| H | 223 | 346 |
| I | 280 | 496 |

In Table 4, characters "A" to "I" correspond to the configurations of FIG. 23A to FIG. 23I, respectively. Further, the "open end surface" means that no reflecting surfaces are provided at the end surface opposing to the end surface arranged with the light source, while the "reflecting end surface" means that a reflecting surface is provided at the end surface opposing to the end surface arranged with the light source.

From the above result, it can be understood that the configurations of FIGS. 23D, 23E, 23F, 23I are advantageous from a viewpoint of luminance, in case of providing two pieces of hot-cathode tubes. In the above experiment, the hot-cathode tube had a tube diameter of 20 mm and the light conducting plate had a thickness of 30 mm, in all situations. These configurations in FIGS. 23D, 23E, 23F, 23I are characterized in that the space surrounded by the profile of the reflector and one side surface of the light conducting plate has those maximum lengths which are not less than 1 and not more than 3 times of the thickness of the light conducting plate, in both of the direction parallel to one of the plate surfaces of the light conducting plate and the direction parallel to the side surface of the light conducting plate.

There will be explained hereinafter a relationship between: a sum of sectional areas of light sources covered by a reflector; and a sectional area of a space surrounded by a profile of the reflector and one side surface of a light conducting plate.

FIG. 24 is a view showing examples of light-source arrangement in which a sum of sectional areas of fluorescent tubes covered by a reflector is not more than 60% of a sectional area of a space surrounded by a profile of the reflector and one side surface of a light conducting plate. In FIG. 24, "●" represents a light source and "○" represents a space corresponding to a light source.

Figure 24A:
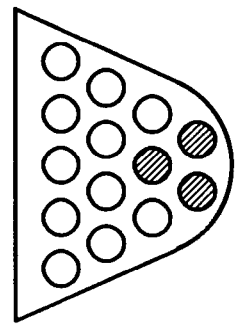
FIGS. 24A to 24D are views each showing examples of light-source arrangement in which a sum of sectional areas of light sources covered by a reflector is not more than 60% of a sectional area of a space surrounded by a profile of the reflector and one side surface of a light conducting plate.
Figure 25:
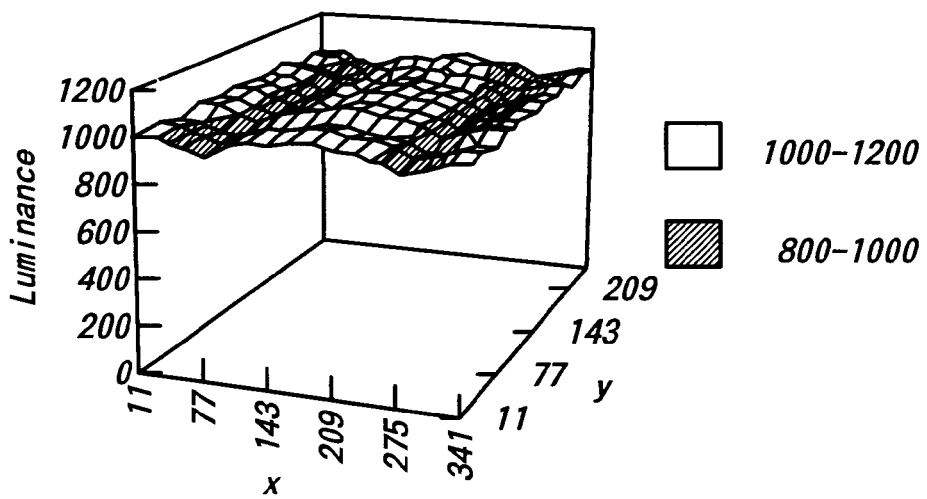
FIG. 25 is a diagram showing a luminance distribution for white pixels, in case of adopting three pieces of white fluorescent tubes while arranging a reflector.

There will be firstly explained a luminance distribution concerning an arrangement of three pieces of fluorescent tubes (FIG. 24A). FIG. 25 shows a luminance distribution for a situation where white fluorescent tubes are adopted as the fluorescent tubes, and where reflectors based on silver films are provided at those end surfaces of the light conducting plate, respectively, other than the remaining one end surface thereof provided with the light sources. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 1,012 (cd/m$^2$), and an "in-plane luminance variance relative to an averaged in-plane luminance" ("luminance uniformity"), i.e., (standard deviation of in-plane luminance)/(averaged luminance) of 0.0303.

Figure 26:
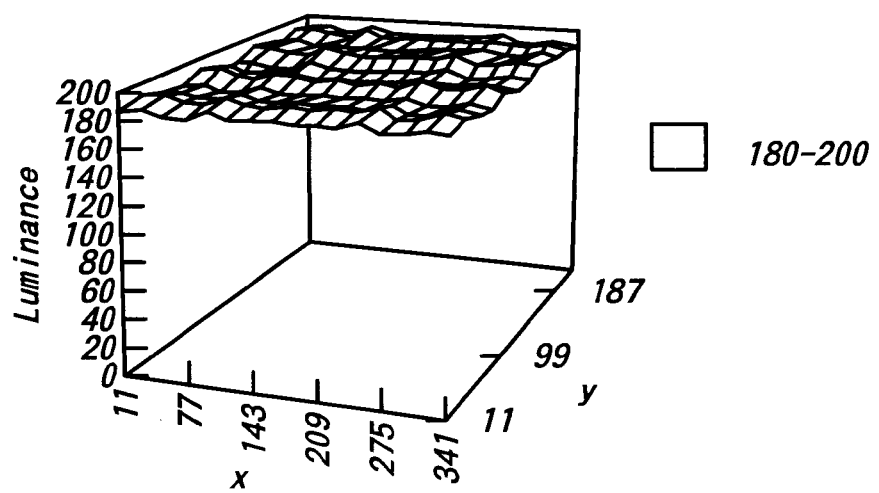
FIG. 26 is a diagram showing a luminance distribution for RGB color pixels, in case of adopting three pieces of white fluorescent tubes while arranging a reflector.

FIG. 26 shows a luminance distribution for a situation where white fluorescent tubes are adopted as the fluorescent tubes, and where reflectors based on silver films are also provided at those end surfaces of the light conducting plate, respectively, other than the remaining one end surface thereof provided with the light sources. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 189 (cd/m$^2$), and an "in-plane luminance variance relative to an averaged in-plane luminance" of 0.017.

Figure 27:
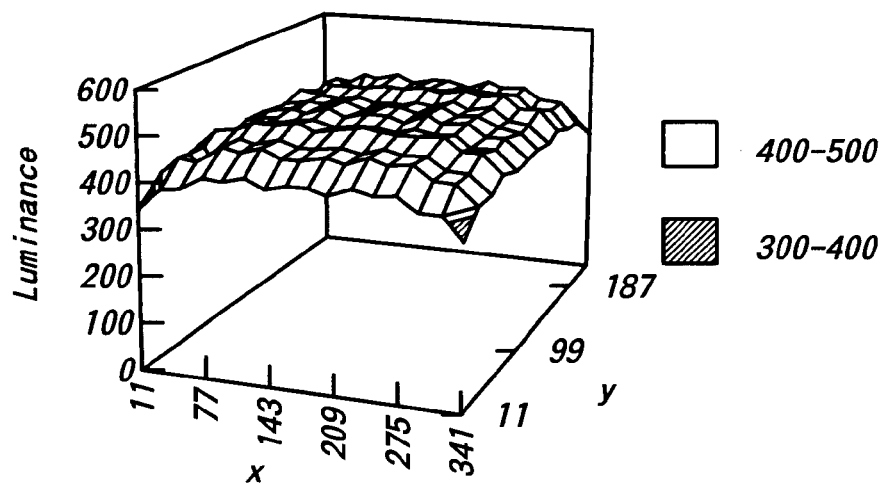
FIG. 27 is a diagram showing a luminance distribution for white pixels, in case of adopting three pieces of white fluorescent tubes while omitting a reflector.

FIG. 27 shows a luminance distribution for a situation where white fluorescent tubes are adopted as the fluorescent tubes, and where the reflectors based on silver films are not provided. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 462 (cd/m$^2$), and an "in-plane luminance variance relative to an averaged in-plane luminance" of 0.0673.

Figure 28:
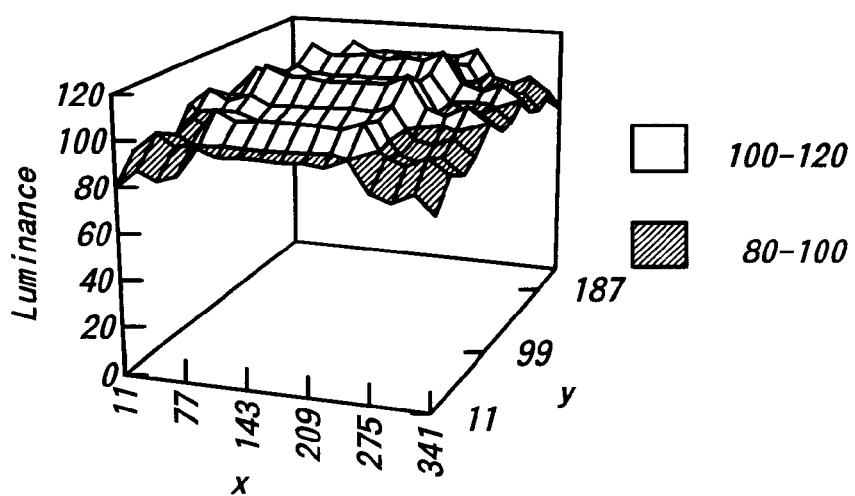
FIG. 28 is a diagram showing a luminance distribution for RGB color pixels, in case of adopting three pieces of white fluorescent tubes while omitting a reflector.

FIG. 28 shows a luminance distribution for a situation where white fluorescent tubes are adopted as the fluorescent tubes, and where the reflectors based on silver films are not provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 101 (cd/m$^2$), and an "in-plane luminance variance relative to an averaged in-plane luminance" of 0.087.

Figure 24B:
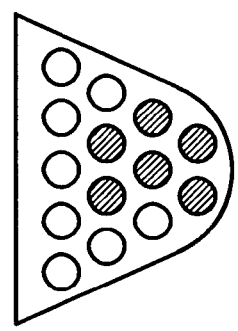
Figure 29:
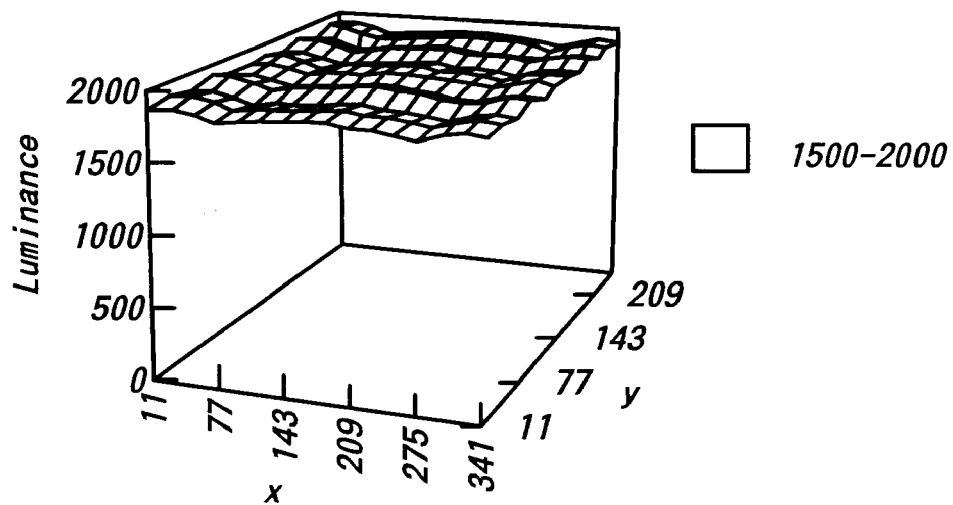
FIG. 29 is a diagram showing a luminance distribution for white pixels, in case of adopting six pieces of white fluorescent tubes while arranging a reflector.

There will be explained hereinafter a luminance distribution concerning an arrangement of six pieces of fluorescent tubes (FIG. 24B). FIG. 29 shows a luminance distribution for a situation where white fluorescent tubes are adopted as the fluorescent tubes, and where reflectors based on silver films are also provided at those end surfaces of the light conducting plate, respectively, other than the remaining one end surface thereof provided with the light sources. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 1,831 (cd/m$^2$), and an "in-plane luminance variance relative to an averaged in-plane luminance" of 0.0147.

Figure 30:
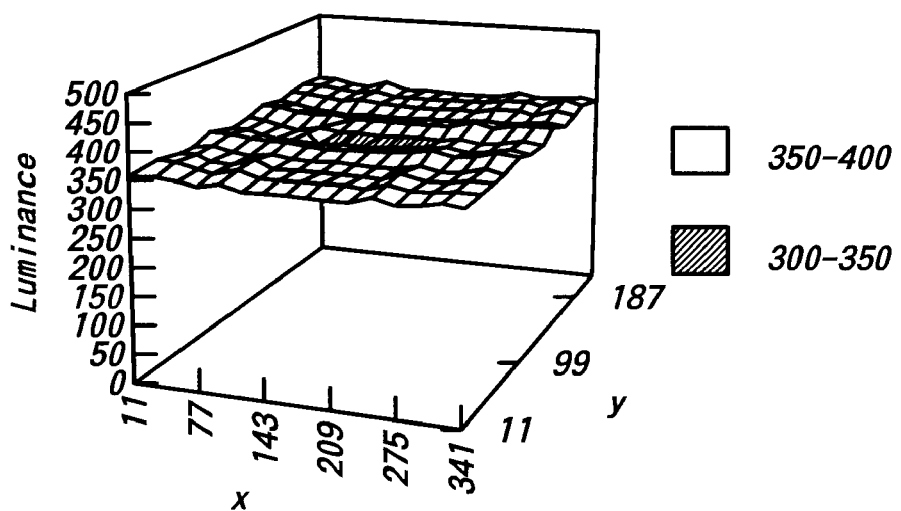
FIG. 30 is a diagram showing a luminance distribution for RGB color pixels, in case of adopting six pieces of white fluorescent tubes while arranging a reflector.

FIG. 30 shows a luminance distribution for a situation where white fluorescent tubes are adopted as the fluorescent tubes, and where the reflectors based on silver films are provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 359 (cd/m$^2$), and an "in-plane luminance variance relative to an averaged in-plane luminance" of 0.0173.

Figure 31:
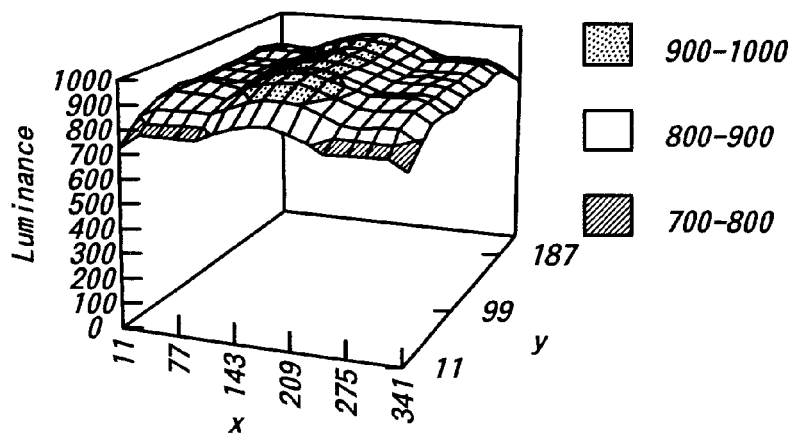
FIG. 31 is a diagram showing a luminance distribution for white pixels, in case of adopting six pieces of white fluorescent tubes while omitting a reflector.

FIG. 31 shows a luminance distribution for a situation where white fluorescent tubes are adopted as the fluorescent tubes, and where the reflectors based on silver films are not provided. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 865 (cd/m$^2$), and an "in-plane luminance variance relative to an averaged in-plane luminance" of 0.0603.

Figure 32:
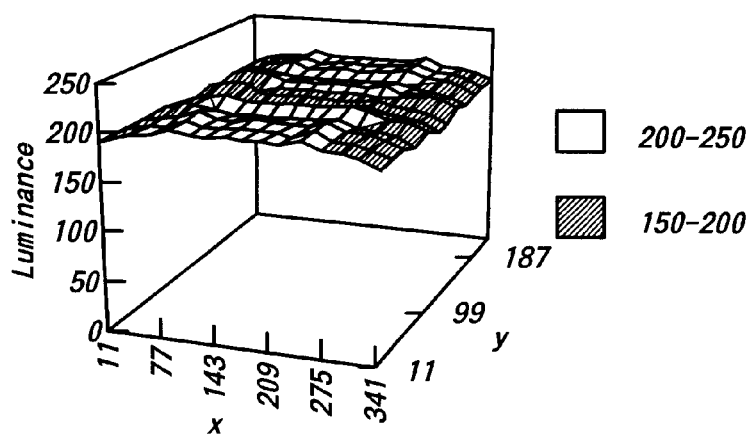
FIG. 32 is a diagram showing a luminance distribution for RGB color pixels, in case of adopting six pieces of white fluorescent tubes while omitting a reflector.

FIG. 32 shows a luminance distribution for a situation where white fluorescent tubes are adopted as the fluorescent tubes, and where the reflectors based on silver films are not provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 199.58 (cd/m$^2$), and an "in-plane luminance variance relative to an averaged in-plane luminance" of 0.034.

Figure 24C:
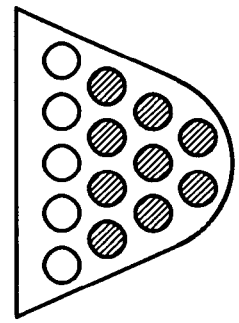
Figure 33:
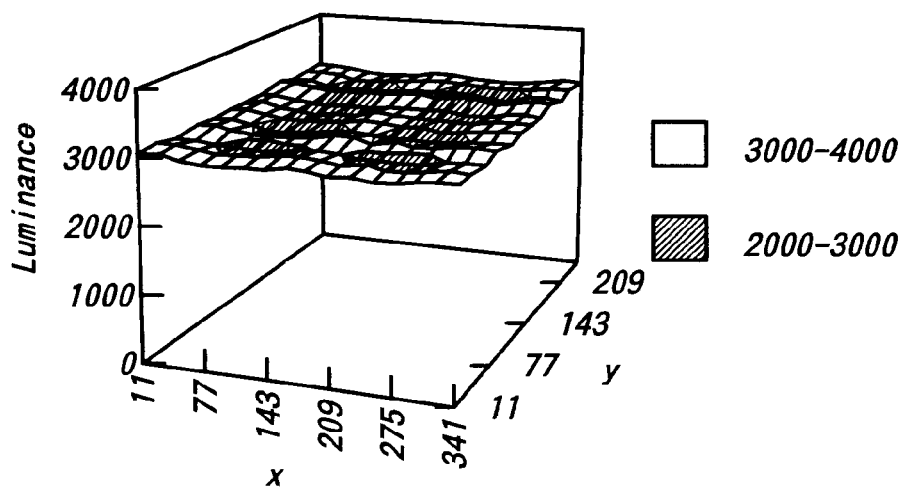
FIG. 33 is a diagram showing a luminance distribution for white pixels, in case of adopting nine pieces of white fluorescent tubes while arranging a reflector.

There will be explained hereinafter a luminance distribution concerning an arrangement of nine pieces of fluorescent tubes (FIG. 24C). FIG. 33 shows a luminance distribution for a situation where white fluorescent tubes are adopted as the fluorescent tubes, and where reflectors based on silver films are also provided at those end surfaces of the light conducting plate, respectively, other than the remaining one end surface thereof provided with the light sources. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 3,029 (cd/m$^2$), and an "in-plane luminance variance relative to an averaged in-plane luminance" of 0.015.

Figure 34:
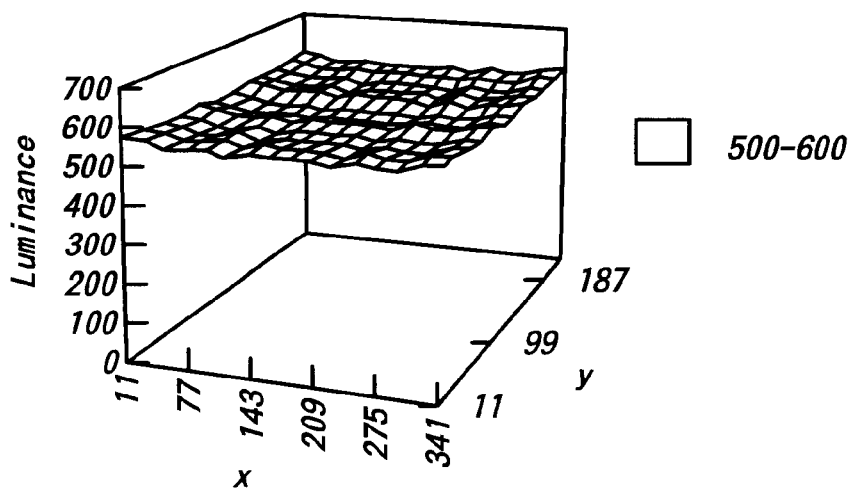
FIG. 34 is a diagram showing a luminance distribution for RGB color pixels, in case of adopting nine pieces of white fluorescent tubes while arranging a reflector.

FIG. 34 shows a luminance distribution for a situation where white fluorescent tubes are adopted as the fluorescent tubes, and where the reflectors based on silver films are provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 554 (cd/m$^2$), and an "in-plane luminance variance relative to an averaged in-plane luminance" of 0.0215.

Figure 35:
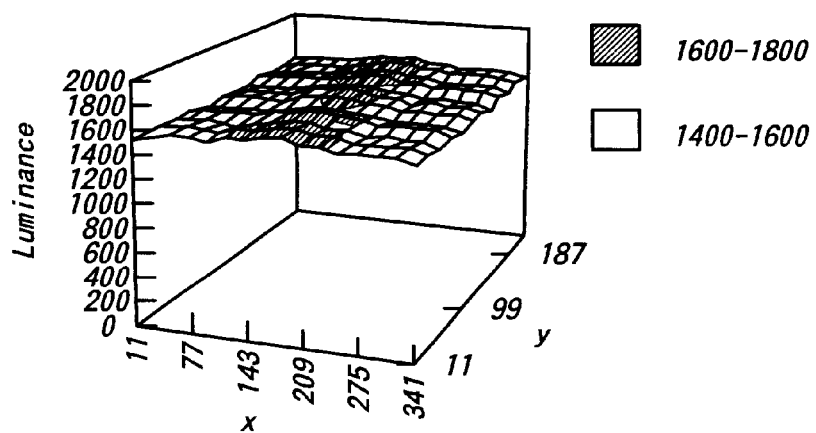
FIG. 35 is a diagram showing a luminance distribution for: white pixels, in case of adopting nine pieces of white fluorescent tubes while omitting a reflector.

FIG. 35 shows a luminance distribution for a situation where white fluorescent tubes are adopted as the fluorescent tubes, and where the reflectors based on silver films are not provided. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 1,575 (cd/m$^2$), and an "in-plane luminance variance relative to an averaged in-plane luminance" of 0.023.

Figure 36:
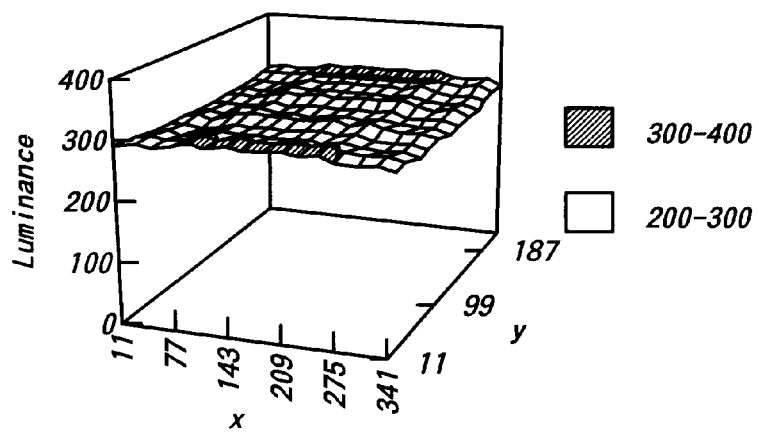
FIG. 36 is a diagram showing a luminance distribution for RGB color pixels, in case of adopting nine pieces of white fluorescent tubes while omitting a reflector.

FIG. 36 shows a luminance distribution for a situation where white fluorescent tubes are adopted as the fluorescent tubes, and where the reflectors based on silver films are not provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 293 (cd/m$^2$), and an "in-plane luminance variance relative to an averaged in-plane luminance" of 0.0242.

Figure 24D:
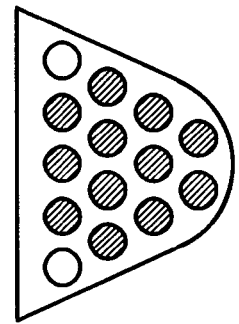
Figure 37:
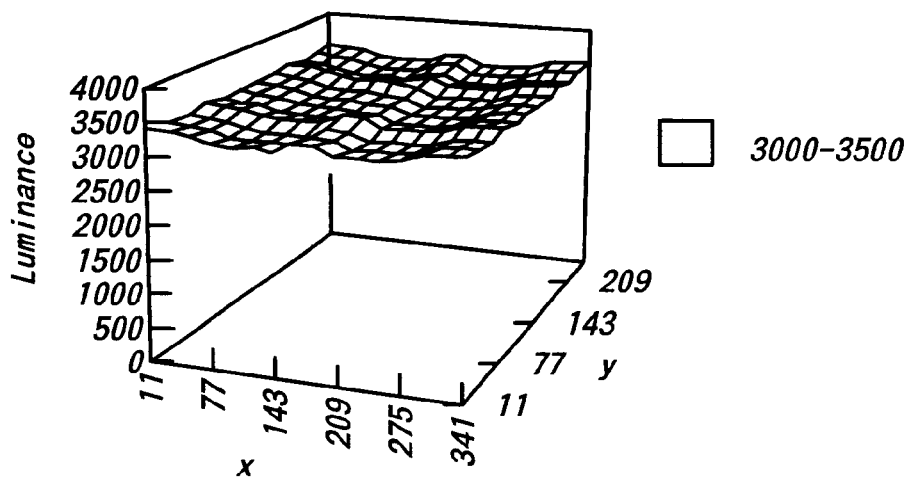
FIG. 37 is a diagram showing a luminance distribution for white pixels, in case of adopting twelve pieces of white fluorescent tubes while arranging a reflector.

There will be explained hereinafter a luminance distribution concerning an arrangement of twelve pieces of fluorescent tubes (FIG. 24D). FIG. 37 shows a luminance distribution for a situation where white fluorescent tubes are adopted as the fluorescent tubes, and where reflectors based on silver films are also provided at those end surfaces of the light conducting plate, respectively, other than the remaining one end surface thereof provided with the light sources. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 3,304 (cd/m$^2$), and an "in-plane luminance variance relative to an averaged in-plane luminance" of 0.0224.

Figure 38:
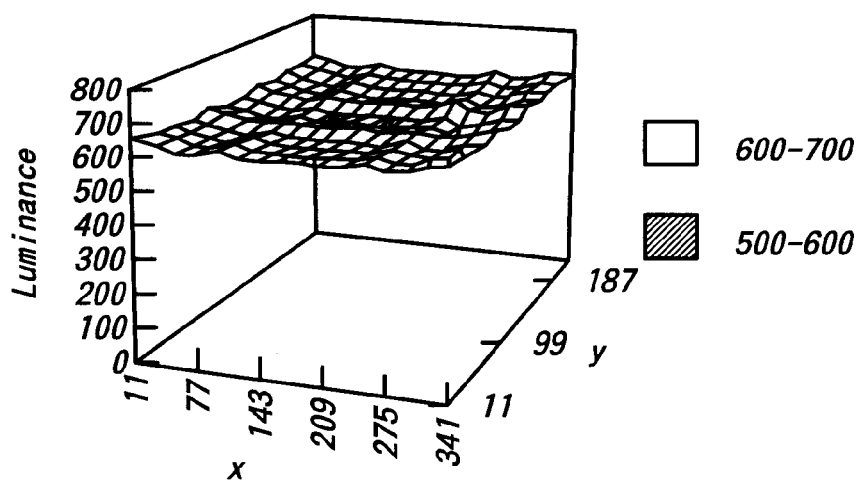
FIG. 38 is a diagram showing a luminance distribution for RGB color pixels, in case of adopting twelve pieces of white fluorescent tubes while arranging a reflector.

FIG. 38 shows a luminance distribution for a situation where white fluorescent tubes are adopted as the fluorescent tubes, and where the reflectors based on silver films are provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 626 (cd/m$^2$), and an "in-plane luminance variance relative to an averaged in-plane luminance" of 0.0244.

Figure 39:
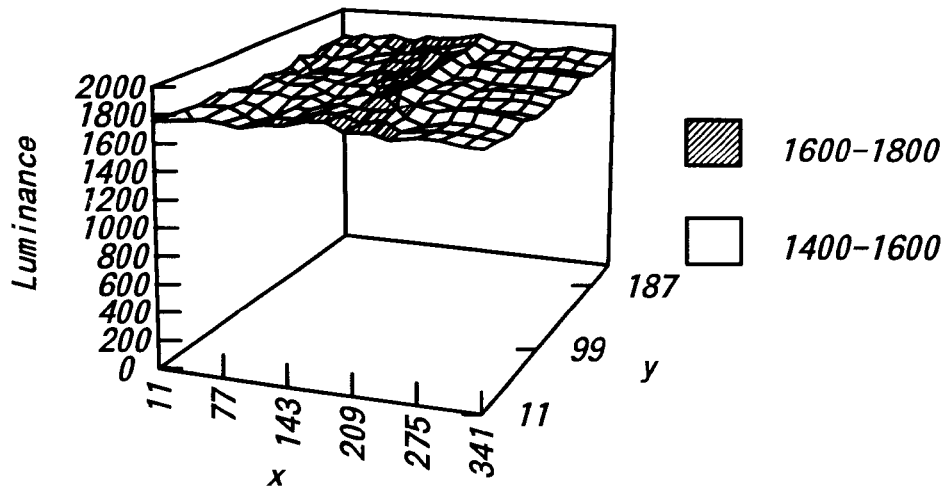
FIG. 39 is a diagram showing a luminance distribution for white pixels, in case of adopting twelve pieces of white fluorescent tubes while omitting a reflector.

FIG. 39 shows a luminance distribution for a situation where white fluorescent tubes are adopted as the fluorescent tubes, and where the reflectors based on silver films are not provided. In this case, all pixels are prepared to be white, and those portions corresponding to the reflectors or light-absorbing layers 28a, 28b, 28c in FIG. 3 are prepared to be light-absorbing layers colored in black, respectively. There are then obtained an averaged luminance of 1,780 (cd/m$^2$), and an "in-plane luminance variance relative to an averaged in-plane luminance" of 0.0194.

Figure 40:
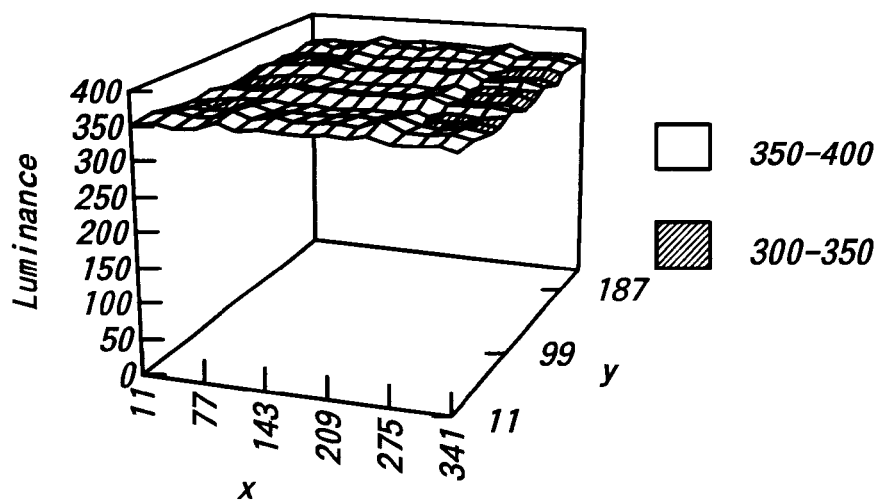
FIG. 40 is a diagram showing a luminance distribution for RGB color pixels, in case of adopting twelve pieces of white fluorescent tubes while omitting a reflector.

FIG. 40 shows a luminance distribution for a situation where white fluorescent tubes are adopted as the fluorescent tubes, and where the reflectors based on silver films are not provided. In this case, pixels are prepared to be RGB color pixels, and those portions corresponding to the reflectors or light-absorbing layers 28a, 28b, 28c in FIG. 3 are prepared to be light-absorbing layers colored in black, respectively. There are then obtained an averaged luminance of 355 (cd/m$^2$), and an "in-plane luminance variance relative to an averaged in-plane luminance" of 0.0177.

Attention is now exemplarily directed to FIGS. 26, 30, 34 and 38 corresponding to those situations where pixels are prepared to be RGB color pixels and the reflectors based on the silver films are provided. In these situations, the numbers of fluorescent lamps are three, six, nine and twelve, respectively. Each situation exhibits an excellent luminance uniformity. Only, in case of twelve pieces, the luminance uniformity tends to be slightly deteriorated as compared with other situations.

Meanwhile, considering an averaged luminance, the averaged luminances in case of six pieces, nine pieces and twelve pieces are 1.8, 2.9 and 3.3 times that in case of three pieces, respectively. Thus, the averaged luminance in case of twelve pieces is not increased, considering the increased number of fluorescent lamps. The reason is that the density or count of light sources relative to the space surrounded by the reflector and the side surface of the light conducting plate is so increased that the efficiency of exiting light-beams is decreased.

When the number of fluorescent lamps is twelve, there is attained a value of about 60% for the ratio: of the sum of sectional areas of light sources; to the sectional area of the space surrounded by the profile of the reflector and the side surface of the light conducting plate. Thus, the ratio of the sum of the sectional areas of light sources is preferably 60% or less, from both viewpoints of luminance uniformity and an exiting light efficiency considering a light quantity to be emitted from light sources toward the light conducting plate with respect to the number of light sources (i.e., power consumption).

There will be explained hereinafter a relationship between; a light source arrangement; and luminance as well as luminance uniformity. FIG. 41 is a view showing arrangement examples of light sources, FIG. 42 is a diagram showing a relationship between the arrangement of light sources shown in FIG. 41 and the luminance, and FIG. 43 is a diagram showing a relationship between the arrangement of light sources shown in FIG. 41 and the luminance uniformity. In FIG. 41, "●" represents a light source and "○" represents a space corresponding to a light source. In FIG. 42, the ordinate is plotted with luminance (cd/m$^2$), while marks "A" through "F" on the abscissa correspond to FIGS. 41A to 41F. In FIG. 43, the ordinate represents luminance uniformity, by an averaged in-plane luminance relative to an in-plane luminance variance, while marks "A" to "F" on the abscissa correspond to FIGS. 41A to 41F.

Figure 41A:
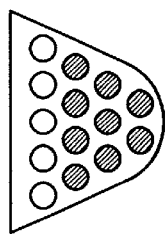
FIGS. 41A to 41F are views each showing arrangement examples of light sources.
Figure 41B:
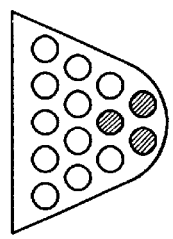
Figure 41C:
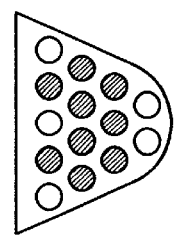
Figure 41D:
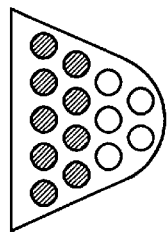
Figure 41E:
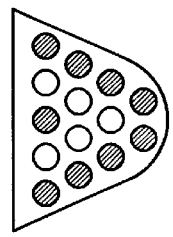
Figure 41F:
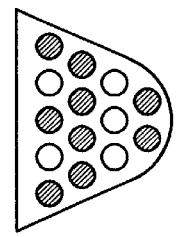
Figure 42:
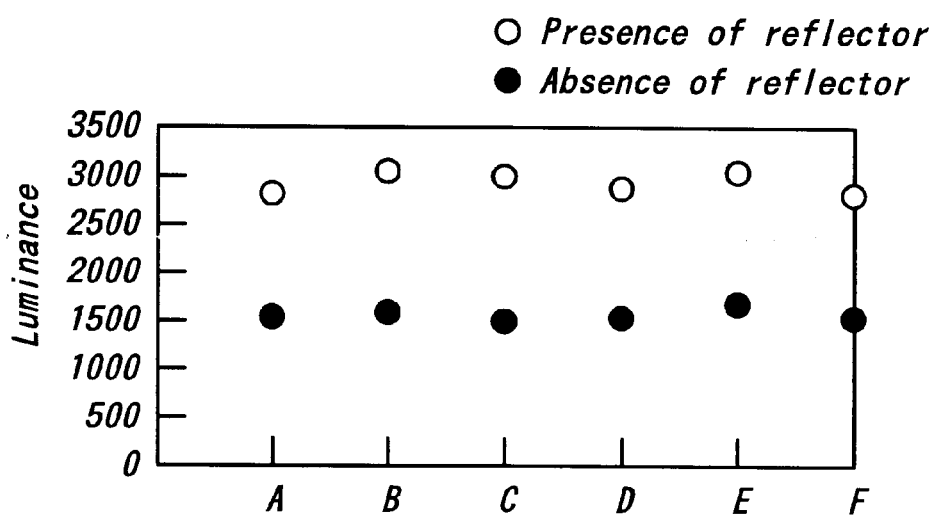
FIG. 42 is a diagram showing a relationship between the arrangement of light sources shown in FIG. 41 and the luminance.
Figure 43:
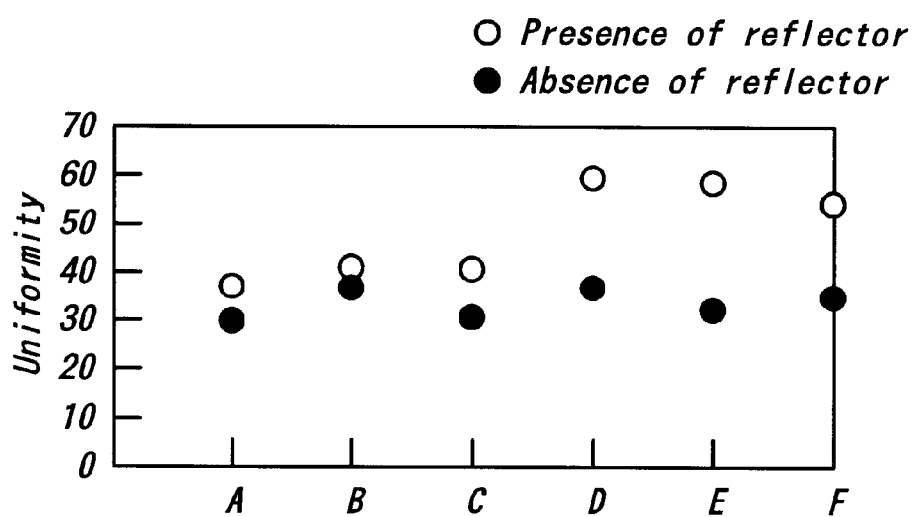
FIG. 43 is a diagram showing a relationship between the arrangement of light sources shown in FIG. 41 and the luminance uniformity.
Figure 44A:
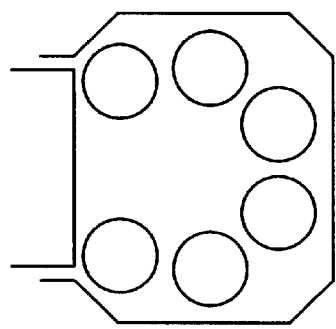
FIGS. 44A to 44D are views each showing reflector shapes in case of adopting hot-cathode tubes.
Figure 44B:
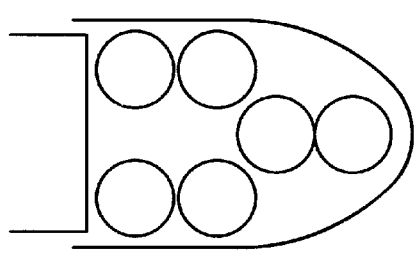
Figure 44C:
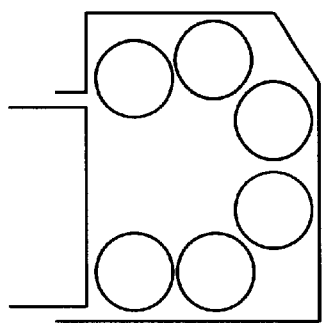
Figure 44D:
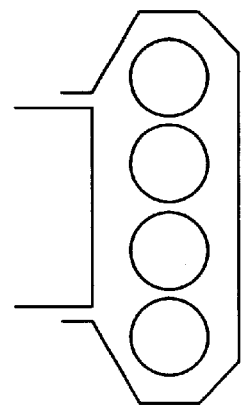

As shown in FIG. 42, there is maintained an excellent luminance of 2,500 cd/m$^2$ or more by providing a reflector, in each of FIGS. 41A to 41F. Further, as shown in FIG. 43, the luminance uniformity is more improved in case of having a reflector in FIGS. 41D, 41E and 41F. Here, the light source arrangements in FIG. 41D and FIG. 41E are examples of arrangements recited in the claims of this application.

The present invention is not limited to the aforementioned embodiments, and many modifications and variations are possible. For example, the optical system of the display according to the present invention can be also applied to the case of forming a video display surface in a cinema complex.

The optical system of the display according to the present invention can be also applied to a display including a plurality of display units each consisting of a display including the display element relating to the present invention. In a first embodiment in this case, there are arranged a plurality of displays by mutually bonding them so as to define predetermined angles among them. In a second embodiment, display elements in arbitrary shapes are arranged in an arbitrary arranging configuration, to be tightly contacted with a back surface of a light conducting plate in an arbitrary shape, thereby allowing to exhibit a desired shape. In a third embodiment, display elements are arranged to be tightly contacted with arbitrary positions of a back surface of a light conducting plate, and thinned-out areas and/or illuminant areas and/or white scatterer areas and/or light absorber areas exist at other arbitrary positions of the back surface of the light conducting plate. In a fourth embodiment, display elements having different colors and/or pixel surface areas and/or pixel pitches are mixedly arranged on a back surface of the same light conducting plate. In a fifth embodiment, there exist a plurality of light conducting plates having back surfaces for arranging display elements thereon, and these light conducting plates are to display parts of the same image signal source, respectively.

It is possible to render a light conducting plate to have a shape other than a rectangular one and to have a rectangular displaying area. It is also possible to form a shape of a light conducting plate as a curved surface having a predetermined curvature. The display element relating to the present invention is allowed to have a constitution other than what is shown in FIG. 3. Further, instead of the glass plates 3-1, 16-1, 17-1, it is possible to adopt quartz, light-permeating plastics such as acryls and polycarbonates, light-permeating ceramics, a structure including a plurality of layers having mutually different refractive indexes, or a body provided with a coating layer at its surface.

Instead of the black-coated glass plate 3-2, it is possible to adopt a plate having a reflecting surface such as a mirror. Instead of or in cooperation with the color-temperature correction lamp, it is possible to provide a light-permeating plate or film for compensating for color temperature, to be arranged at a reflecting surface of a reflector or a side surface of a light conducting plate.

It is enough to arrange a light source and a reflector on at least one side surface of a light conducting plate, and to arrange only reflectors on other side surfaces. In arranging only a reflector, the space surrounded by the profile of the reflector and one side surface of the light conducting plate is to have those maximum lengths which are 3.0 or less times of the thickness of the light conducting plate in the direction parallel to one of the plate surfaces of the light conducting plate and 1.5 or less times of the thickness of the light conducting plate in the direction parallel to the side surface of the light conducting plate, respectively.

Figure 45:
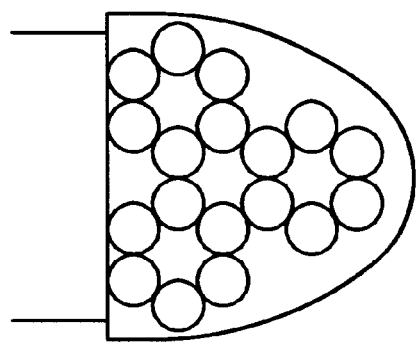
FIG. 45 is a view showing reflector shapes in case of adopting cold-cathode tubes.

As a reflector for surrounding a light source(s), the shape recited in claims 8, 9 are preferable, as already described. As preferable examples thereof, FIGS. 44A to 44D show reflector shapes in case of adopting hot-cathode tubes as light sources, respectively, and FIG. 45 shows a reflector shape in case of adopting cold-cathode tubes as light sources.

Figure 46:
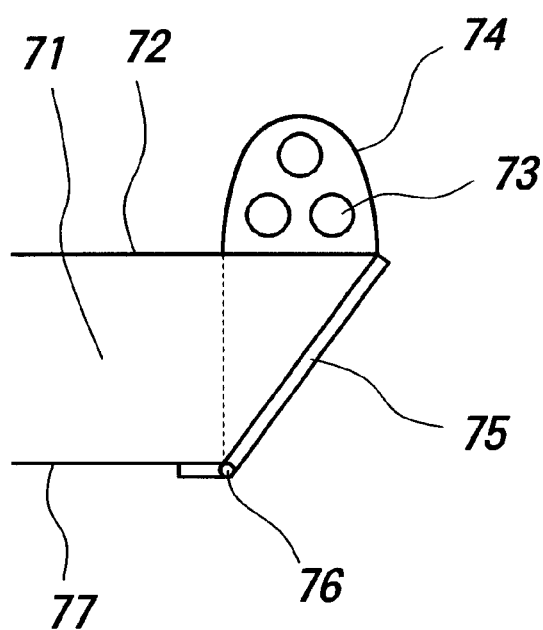
FIG. 46 is a view showing a variant of reflector arrangement.

Further, FIG. 46 shows a variant of a reflector arrangement, capable of adopting arbitrary kinds of light sources. In this case, there is arranged a light source 73 for one plate surface 72 of a light conducting plate 71, and the light source 73 is surrounded by the plate surface 72 and a reflector 74. Along that end surface of the light conducting plate 71 which is inclined to the plate surface 72, there are provided a reflection mirror 75 and a light absorber 76. Note, the displaying surface of the display is formed on one of the plate surface 72 and plate surface 77 of the light conducting plate 71.

What is claimed is:

1. An optical system of a display comprising
   a light conducting plate introduced with light;
   a panel portion provided to oppose to one plate surface of said light conducting plate, said panel portion including a driving part arranged with actuator parts each corresponding to a plurality of pixels so as to control displacement motions of said actuator parts in contacting and separating directions with respect to said light conducting plate correspondingly to attributions of input image signals, thereby controlling leaked lightbeams in predetermined regions of said light conducting plate, to thereby cause said light conducting plate to display an image corresponding to the image signals;
   at least one light source arranged to oppose one plate surface or one side surface of said light conducting plate; and
   a reflector for surrounding said light source in cooperation with said one plate surface or said one side surface of said light conducting plate, said reflector having a reflecting surface for reflecting light-beams from said light source.

2. An optical system of a display according to claim 1, wherein said panel portion is provided with display elements having a predetermined number of pixels arranged on said one plate surface of said light conducting plate;
   said optical system of the display further comprising a frame surrounding an outer periphery of said panel portion.

3. An optical system of a display according to claim 2, wherein said frame has a light absorbing or a light reflecting surface.

4. An optical system of a display according to claim 1, wherein said light conducting plate is rectangular or has a rectangular displaying area, and said light conducting plate has a thickness of more than 0.01 and less than 0.1 times a diagonal length of said light conducting plate or of said rectangular displaying area thereof.

5. An optical system of a display according to claim 1, wherein said light source comprises two or more light sources;
   wherein said light sources are arranged having predetermined intervals therebetween along said one side surface of said light conducting plate; and
   wherein said predetermined interval is not more than 0.05 times the shortest distance between an outer periphery of said panel portion and said one side surface of said light conducting plate.

6. An optical system of a display according to claim 1, further comprising a color-temperature correction light source arranged for said one plate surface or one side surface of said light conducting plate.

7. An optical system of a display according to claim 1, further comprising a color-temperature correction lightpermeating plate or film arranged for said reflecting surface of said reflector or for said one plate surface or one side surface of said light conducting plate.

8. An optical system of a display according to claim 1, wherein said reflector has a profile in an outwardly convex shape formed by straight lines, continuous curved lines, or a combination thereof.

9. An optical system of a display according to claim 8, wherein a space surrounded by said profile of said reflector and said one plate surface or one side surface of said light conducting plate has maximum lengths which are not more than 3 times the thickness of said light conducting plate, in both the direction parallel to said one plate surface of said light conducting plate and the direction parallel to said one side surface of said light conducting plate.

10. An optical system of a display according to claim 1, wherein a sum of sectional areas of light sources covered by said reflector is not more than 60% of a sectional area of a space surrounded by a profile of said reflector and said one plate surface or one side surface of said light conducting plate.

11. An optical system of a display according to claim 1, further comprising a further reflector defining a space in cooperation with a side surface of said light conducting plate, other than said one plate surface or one side surface of said light conducting plate, said further reflector having a reflecting surface for reflecting light-beams from said light source.

12. An optical system of a display according to claim 11, wherein a space surrounded by a profile of said further reflector and said one plate surface or one side surface of said light conducting plate has those maximum lengths which are not more than 3.0 times the thickness of said light conducting plate in the direction parallel to said one plate surface of said light conducting plate, and not more than 1.5 times the thickness of said light conducting plate in the direction parallel to said one side surface of said light conducting plate, respectively.

13. An optical system of a display according to claim 11, wherein said further reflector has a profile in an outwardly convex shape formed by straight lines, continuous curved lines, or a combination thereof.

14. An optical system of a display according to claim 13, wherein a space surrounded by said profile of said further reflector and said one plate surface or one side surface of said light conducting plate has maximum lengths which are not more than 3.0 times the thickness of said light conducting plate in the direction parallel to said one plate surface of said light conducting plate, and not more than 1.5 times the thickness of said light conducting plate in the direction parallel to said one side surface of said light conducting plate, respectively.

15. An optical system of a display according to claim 1, further comprising a first light-source group comprising not less than two light sources and a second light-source group comprising light sources in number less than the number of light sources of said first light-source group;

said light sources of said first light-source group are arranged along one side surface of said light conducting plate, at predetermined intervals between adjacent ones of said light sources of said first light-source group; and said light sources of said second light-source group are arranged along said first light-source group, at predetermined intervals between said light sources of said second light-source group and adjacent ones of said light sources of said first light-source group and at predetermined intervals between adjacent ones of said light sources of said second light-source group.

16. An optical system of a display according to claim 1, further comprising a light-source group comprising a plurality of light sources arranged along said reflecting surface of said reflector, at predetermined intervals between adjacent ones of said light sources;

wherein said light-source group includes a first light source and a second light source, said first light source and said second light source being closest to one side surface of said light conducting plate; and further comprising an additional light source arranged at an intermediate position of said first light source and said second light source.

\* \* \* \* \*